(12) United States Patent
Kobayashi et al.

(10) Patent No.: US 11,689,673 B2
(45) Date of Patent: Jun. 27, 2023

(54) PRINTING DEVICE

(71) Applicant: SEIKO EPSON CORPORATION, Tokyo (JP)

(72) Inventors: Chiharu Kobayashi, Nagano (JP); Toru Matsuyama, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/652,283

(22) Filed: Feb. 24, 2022

(65) Prior Publication Data

US 2022/0279081 A1    Sep. 1, 2022

(30) Foreign Application Priority Data

Feb. 26, 2021    (JP) .............................. JP2021-030431

(51) Int. Cl.
*G06F 3/12* (2006.01)
*H04N 1/00* (2006.01)
*G06F 3/044* (2006.01)
*G06F 3/16* (2006.01)

(52) U.S. Cl.
CPC ......... *H04N 1/00488* (2013.01); *G06F 3/044* (2013.01); *G06F 3/167* (2013.01); *H04N 1/00411* (2013.01)

(58) Field of Classification Search
CPC ........... H04N 1/00488; H04N 1/00411; G06F 3/044; G06F 3/167
See application file for complete search history.

(56) References Cited

U.S. PATENT DOCUMENTS

| 2014/0255057 | A1* | 9/2014 | Yoshino | G03G 21/206 399/92 |
| 2017/0064106 | A1* | 3/2017 | Murakami | H04N 1/00493 |
| 2018/0063346 | A1* | 3/2018 | Uehara | G03G 21/1604 |
| 2019/0166416 | A1* | 5/2019 | Taguchi | H04N 1/00488 |

FOREIGN PATENT DOCUMENTS

| JP | 2005-123700 A | 5/2005 |
| JP | 2017-202617 A | 11/2017 |

* cited by examiner

*Primary Examiner* — Moustapha Diaby
(74) *Attorney, Agent, or Firm* — Global IP Counselors, LLP

(57) ABSTRACT

A printing device includes a panel unit which operation information for operating a printing unit is input, and a speaker that is stored in a main housing of the printing unit and outputs an operating sound, the main housing includes a sound emitting hole that emits the operating sound to an outside of the main housing, the sound emitting hole is located such that at least a part thereof overlaps the panel unit when the panel unit is viewed from the normal direction.

5 Claims, 11 Drawing Sheets

PRINTING DEVICE

The present application is based on, and claims priority from JP Application Serial Number 2021-030431, filed Feb. 26, 2021, the disclosure of which is hereby incorporated by reference herein in its entirety.

BACKGROUND

1. Technical Field

The present disclosure relates to a printing device.

2. Related Art

In recent years, printing devices have been used in a wide variety of environments such as homes and offices. Therefore, when manufacturing a printing device, there is a need to develop a printing device with excellent usability that anyone can use in the same way by considering not only the height and gender of a user who uses the printing device but also whether or not there is an impairment.

For example, JP-A-2005-123700 discloses an image processing device (printing device) capable of being operated in the same manner as a healthy person even by a user having a visual or hearing impairment by providing an operation panel, a speaker, and a microphone integrally so that the operation can be performed based on both visual information and auditory information. Further, JP-A-2017-202617 discloses an image forming device (printing device) having a large operation panel, which is capable of improving operability by separately providing an operation panel and a speaker so that the size of the operation panel can be increased.

However, since the printing device described in JP-A-2005-123700 is provided with a speaker, a microphone, and the like integrally with the operation panel, the display area of the operation panel is pressed by the speaker and microphone, making it difficult to increase the size of the operation panel. A printing device that does not include such an enlarged operation panel may significantly reduce operability for a user who suffers from symptoms, such as Parkinson's disease and essential tremor, accompanied by tremors at the ends of fingertips and the like. On the other hand, in the disclosure described in JP-A-2017-202617, the operation panel and the speaker are disposed separately to realize an increase in the size of the operation panel. However, since the operation panel and the speaker are disposed separately, it may be difficult to provide a printing device that can be operated in the same manner as a healthy person by a user having a visual or hearing impairment, which has been realized in the disclosure described in JP-A-2005-123700.

That is, in the disclosures described in JP-A-2005-123700 and JP-A-2017-202617, there is room for further improvement from the viewpoint of providing a printing device in consideration of usability.

SUMMARY

According to an aspect of the present disclosure, there is provided a printing device including a printing unit that performs printing on a medium, a panel unit to which operation information for operating the printing unit is input, and a speaker that outputs an operating sound including at least one of an operation sound corresponding to an operation of the panel unit and a state sound indicating an operating state of the printing unit, in which the printing unit includes a printing mechanism that executes a printing operation according to the operation information, a main circuit board including a processor that controls an operation of the panel unit and controls an operation of the printing mechanism based on the operation information, and a main housing that stores the printing mechanism and the main circuit board, the panel unit includes a display panel, a capacitive touch sensor in which a capacitive position detection sensor and a cover glass are laminated, and a panel circuit board electrically coupled to the capacitive touch sensor, the speaker is stored in the main housing, the main housing includes a sound emitting hole that emits the operating sound to an outside of the main housing, the panel unit is rotatably attached to the printing unit so as to take a first attachment state in which an angle formed by a horizontal direction and a normal direction of the capacitive touch sensor is larger than an angle formed by a vertical direction and the normal direction and a second attachment state in which the angle formed by the horizontal direction and the normal direction is smaller than the angle formed by the vertical direction and the normal direction, and in at least one of the first attachment state and the second attachment state, the sound emitting hole is located such that at least a part thereof overlaps the panel unit when the panel unit is viewed from the normal direction.

DESCRIPTION OF EXEMPLARY EMBODIMENTS

Hereinafter, preferred embodiments of the present disclosure will be described with reference to the drawings. The drawings used are for convenience of description. The embodiments to be described below do not unduly limit the contents of the present disclosure described in the scope of claims. In addition, all of the configurations to be described below are not necessarily essential configuration requirements of the present disclosure.

Hereinafter, as a printing device according to the present disclosure, an ink jet printer that prints an image by ejecting a liquid onto a medium will be described as an example. However, the printing device is not limited to an ink jet printer, and may be a dot impact printer, a thermal transfer printer, a laser printer, or the like, or a copying machine such as a copier. Further, the printing device may be a so-called multifunction device in which an image forming device such as an ink jet printer, a dot impact printer, a thermal transfer printer, and a laser printer is integrated with a scanner, a copying machine, a FAX, and the like.

1. Functional Configuration of Printing Device

Figure 1:
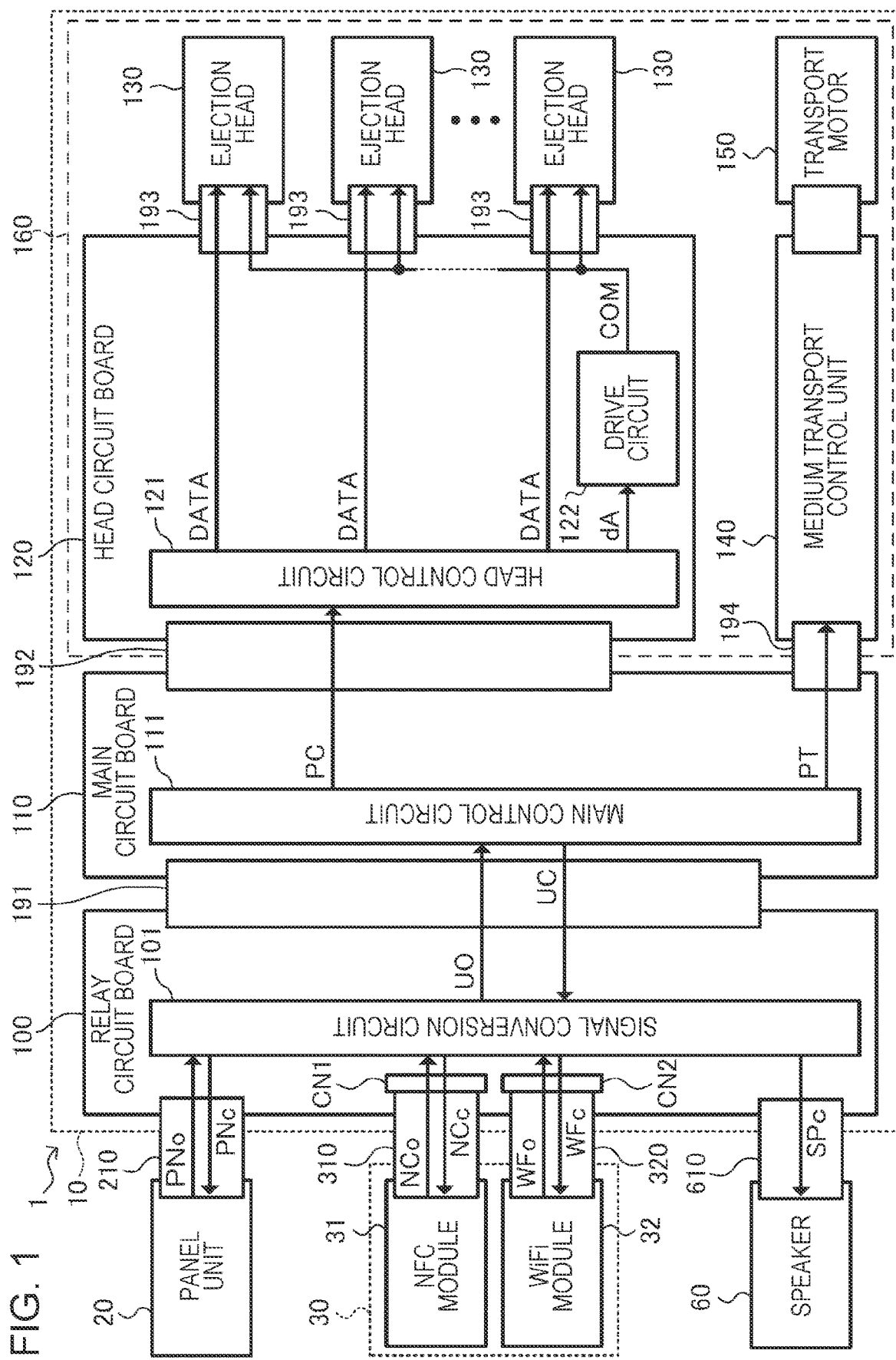
FIG. 1 is a diagram for describing a functional configuration of a printing device.

FIG. 1 is a diagram for describing a functional configuration of a printing device 1. As shown in FIG. 1, the printing device 1 includes a printing unit 10, a panel unit 20, a wireless communication unit 30, and a speaker 60. Then, the printing device 1 prints a desired image on a medium by causing the printing unit 10 to land ink at a predetermined position on the medium based on information input from the panel unit 20 and the wireless communication unit 30, and outputs an operating sound associated with the operation of the printing unit 10, the panel unit 20, and the wireless communication unit 30 from the speaker 60. That is, the printing device 1 includes a printing unit 10 that performs printing on a medium, a panel unit 20 to which operation information for operating the printing unit 10 is input, and a speaker 60 that outputs an operating sound including at least one of an operation sound corresponding to the operation of the panel unit 20 and a state sound indicating the operating state of the printing unit 10.

Here, the operation sound corresponding to the operation of the panel unit 20 as an operating sound output from the speaker 60 includes, for example, a touch sound generated when the user operates the panel unit 20, a confirmation sound indicating that the operation of the panel unit 20 by the user has been confirmed, a cancel sound indicating that the operation has been canceled, a panel operation guidance voice that guides the user to operate the panel unit 20, and the like. Further, the state sound indicating the operating state of the printing unit 10 as an operating sound output from the speaker 60 includes an end notification sound for notifying the user that the printing operation executed by the printing unit 10 has ended, an error notification sound for notifying the user that an error has occurred during the printing operation executed by the printing unit 10, a printing operation execution notification sound for notifying the user that the printing operation is being executed, a printing unit operation guidance voice that guides the user to operate the printing unit 10, and the like. That is, the operating sound output from the speaker 60 includes various sounds such as a beep sound, a melody sound, and a voice for notifying the user of the state of the printing device 1 and urging and guiding the operation of the printing device 1 by the user.

The speaker 60 that outputs such an operating sound is preferably a so-called piezoelectric speaker that outputs an operating sound when a piezoelectric element is driven. As a result, the speaker 60 can be miniaturized. Therefore, by providing the speaker 60, a possibility that the printing device 1 becomes large is reduced.

In the present embodiment, a case where the medium on which the printing device 1 prints a desired image is sheet-fed paper will be illustrated and described. However, the medium on which the printing device 1 prints a desired image is not limited to sheet-fed paper, and may be, for example, roll paper. Further, the medium on which the printing device 1 prints a desired image is not limited to paper, and may be a fiber material such as a cloth or a resin material such as plastic.

Operation information for operating the printing device 1 is input to the panel unit 20 by an operation of a user, and an operating state of the printing device 1 is displayed thereon. Specifically, the operation of the panel unit 20 is controlled by a panel control signal PNc input from the printing unit 10 via a cable 210, and the operating state of the printing device 1 propagated based on the panel control signal PNc is displayed thereon. Further, the panel unit 20 outputs the operation information input by the user as a panel operation signal PNo to the printing unit 10 via the cable 210. Here, the panel control signal PNc input to the panel unit 20 and the panel operation signal PNo output by the panel unit 20 may be, for example, a signal conforming to I squared C (I2C) communication propagated by serial data and a serial clock, or a differential signal such as low voltage differential signaling (LVDS) communication. The details of the functional configuration of the panel unit 20 and the details of the structure will be described later.

The wireless communication unit 30 is a wireless communication device capable of receiving a wireless signal from the outside by wireless communication, and includes a near field communication (NFC) module 31 that performs wireless communication at a short distance of several cm to several tens of cm, and a WiFi module 32 capable of performing long-range and high-speed wireless communication as compared with the NFC module 31.

The operation of the NFC module 31 is controlled based on an NFC control signal NCc input from the printing unit 10 via a connector CN1 and a cable 310 coupled to the connector CN1, and information input to the NFC module 31 as a wireless signal is output to the printing unit 10 via the connector CN1 and the cable 310 as an NFC reception signal NCo. Such an NFC module 31 that performs wireless communication at a short distance of several cm to several tens of cm is used, for example, for an authentication function or the like for correlating a user who executed the printing operation with the medium on which the printing operation is executed when the printing device 1 is shared by a plurality of users.

The operation of the WiFi module 32 capable of performing long-range and high-speed wireless communication is controlled based on a WiFi control signal WFc input from the printing unit 10 via a connector CN2 and a cable 320 coupled to the connector CN2, and information input to the WiFi module 32 as a wireless signal is output to the printing unit 10 via the connector CN2 and the cable 320 as a WiFi reception signal WFo. Such a WiFi module 32 capable of performing long-range and high-speed wireless communication also functions as an interface circuit that connects the printing device 1 with an external device such as a personal computer that outputs image information to be printed on the medium by the printing device 1 by a wireless signal.

Here, the NFC module 31 and the WiFi module 32 may be detachable from the printing device 1 by being communicably connected via, for example, a universal serial bus (USB) terminal or the like. That is, the printing device 1 includes connectors CN1 and CN2 to which the NFC module 31 and the WiFi module 32 can be attached, and communication with the printing unit 10 is realized by coupling the NFC module 31 and the WiFi module 32 to the connectors CN1 and CN2.

The operation of the speaker 60 is controlled based on a speaker control signal SPc input from the printing unit 10 via a cable 610. Then, the speaker 60 outputs an operating sound based on the input speaker control signal SPc.

The printing unit 10 includes a relay circuit board 100, a main circuit board 110, a head circuit board 120, a plurality of ejection heads 130, a medium transport control unit 140, and a transport motor 150.

The main circuit board 110 includes a main control circuit 111 that outputs a control signal for controlling each portion of the printing device 1. The main control circuit 111 includes a system on a chip (SoC) including a central processing unit (CPU).

The main control circuit 111 outputs a unit control signal UC for controlling the operation of the panel unit 20, the wireless communication unit 30, and the speaker 60. The unit control signal UC is input to a signal conversion circuit 101 in the relay circuit board 100 via a cable 191. The signal conversion circuit 101 generates a panel control signal PNc that controls the panel unit 20 based on the unit control signal UC input from the main control circuit 111. Then, the signal conversion circuit 101 outputs the panel control signal PNc to the panel unit 20 via the cable 210. Further, the signal conversion circuit 101 generates an NFC control signal NCc that controls the NFC module 31 based on the unit control signal UC input from the main control circuit 111. Then, the signal conversion circuit 101 outputs the NFC control signal NCc to the NFC module 31 via the connector CN1 provided on the relay circuit board 100 and the cable 310. Further, the signal conversion circuit 101 generates a WiFi control signal WFc that controls the WiFi module 32 based on the unit control signal UC input from the main control circuit 111. Then, the signal conversion circuit 101 outputs the WiFi control signal WFc to the WiFi module 32 via the connector CN2 provided on the relay circuit board 100 and the cable 320. Further, the signal conversion circuit 101 generates a speaker control signal SPc that controls the speaker 60 based on the unit control signal UC input from the main control circuit 111. Then, the signal conversion circuit 101 outputs the speaker control signal SPc to the speaker 60 via the cable 610.

Further, the panel operation signal PNo output by the panel unit 20, the NFC reception signal NCo output by the NFC module 31, and the WiFi reception signal WFo output by the WiFi module 32 are input to the signal conversion circuit 101. Then, the signal conversion circuit 101 generates a unit output signal UO based on the input panel operation signal PNo, NFC reception signal NCo, and WiFi reception signal WFo, and outputs the unit output signal UO to the main control circuit 111.

Here, the signal conversion circuit 101 may be configured as one integrated circuit device, or may be configured as a plurality of integrated circuit devices corresponding to each of the panel unit 20, the NFC module 31, and the WiFi module 32. Further, the unit control signal UC and the unit output signal UO propagating between the signal conversion circuit 101 and the main control circuit 111 may be a plurality of signals corresponding to each of the panel unit 20, the NFC module 31, and the WiFi module 32. That is, the main control circuit 111 may output a plurality of signals corresponding to each of the panel control signal PNc, the NFC control signal NCc, and the WiFi control signal WFc as the unit control signal UC to the signal conversion circuit 101, and the signal conversion circuit 101 may output a plurality of signals corresponding to each of the panel operation signal PNo, the NFC reception signal NCo, and the WiFi reception signal WFo as the unit output signal UO to the main control circuit 111. Such a relay circuit board 100 relays signals propagated between the main circuit board 110 and the panel unit 20, the NFC module 31, the WiFi module 32, and the speaker 60.

Further, the main control circuit 111 transports the medium on which the printing operation is executed based on the unit output signal UO input from the signal conversion circuit 101. Specifically, the main control circuit 111 generates a transport control signal PT for transporting the medium on which the printing operation is executed, and outputs the transport control signal PT to the medium transport control unit 140 via a cable 194. The medium transport control unit 140 generates a drive control signal for controlling the drive of the transport motor 150 based on the input transport control signal PT, and outputs the drive control signal to the transport motor 150. Thereby, the transport motor 150 is driven, and the medium is transported along a predetermined transport direction as the transport motor 150 is driven.

Further, the main control circuit 111 generates a print control signal PC for performing printing on the medium based on the unit output signal UO input from the signal conversion circuit 101, and outputs the print control signal PC to the head circuit board 120 via the cable 192.

The print control signal PC is input to a head control circuit 121 in the head circuit board 120. The head control circuit 121 generates a print data signal DATA corresponding to each of the plurality of ejection heads 130 having a plurality of nozzles for ejecting ink to the medium based on the input print control signal PC, and supplies the print data signal DATA to the corresponding ejection head 130. Further, the head control circuit 121 generates a basic drive signal dA which is a basis of a drive signal COM based on the print control signal PC input from the signal conversion circuit 101, and outputs the basic drive signal dA to the drive circuit 122. Then, the drive circuit 122 generates a drive signal COM having a waveform defined by the basic drive signal dA supplied from the head control circuit 121, and outputs the drive signal COM to the plurality of ejection heads 130.

Each of the plurality of ejection heads 130 includes a plurality of nozzles for ejecting ink to the medium, and a plurality of drive elements that correspond to each of the plurality of nozzles and drive the ink to be ejected from the corresponding nozzles by being supplied with the drive signal COM. Each of the plurality of ejection heads 130 is electrically coupled to the head circuit board 120 via a cable 193. Each of the ejection heads 130 switches whether or not to supply the drive signal COM supplied from the drive circuit 122 to each of the plurality of drive elements based on the print data signal DATA supplied from the head control circuit 121. Thereby, the drive signal COM is supplied to the drive element corresponding to the nozzle that ejects ink to the medium among the plurality of nozzles, and the drive signal COM is not supplied to the drive element corresponding to the nozzle that does not eject ink to the medium among the plurality of nozzles. As a result, ink is ejected only from the nozzle corresponding to the drive element to which the drive signal COM is supplied, and ink is not ejected from the nozzle corresponding to the drive element to which the drive signal COM is not supplied. That is, the plurality of ejection heads 130 eject ink at timings defined by the print data signal DATA and from the nozzles designated by the print data signal DATA by switching whether or not to supply the drive signal COM to each of the plurality of drive elements based on the print data signal DATA output by the head control circuit 121.

As described above, in the printing device 1 according to the present embodiment, the main control circuit 111 controls the transport of the medium via the medium transport control unit 140, and also controls the operation of the head control circuit 121 in the head circuit board 120 based on the operation information input from the panel unit 20 and the wireless communication unit 30. Thereby, a nozzle that ejects ink to the medium and a nozzle that does not eject ink are selected. That is, the main control circuit 111 controls both the transport of the medium and the ejection timing of the ink. Thereby, the ejection head 130 can land the ink at a desired position on the medium. As a result, dots are formed at desired positions on the medium and a desired image is printed on the medium.

Here, in the following description, a configuration including the head circuit board 120, the plurality of ejection heads 130, the medium transport control unit 140, and the transport motor 150, which execute printing operations on the medium under the control of the main circuit board 110, may be collectively referred to as a printing mechanism 160. That is, the printing unit 10 includes the printing mechanism 160 that executes a printing operation of printing an image on a medium according to operation information input by a user by operating the panel unit 20 and operation information input as a wireless signal via the wireless communication unit 30, the main circuit board 110 including the main control circuit 111 that outputs the unit control signal UC for controlling the operation of the panel unit 20 and the wireless communication unit 30 and that controls the operation of the printing mechanism 160 according to the unit output signal UO based on the panel operation signal PNo, the NFC reception signal NCo, and the WiFi reception signal WFo output by the panel unit 20 and the wireless communication unit 30, and the relay circuit board 100 that relays signals propagated between the main circuit board 110 and the panel unit 20, the NFC module 31, and the WiFi module 32.

The printing device 1 may have a USB port, a LAN port, or the like for connecting the printing device 1 to an external device by using a local area network (LAN) cable or a USB cable. Further, the printing device 1 may be able to read out the image information stored in the storage medium such as the hard disk and the flash memory connected to the USB port, the LAN port, or the like by the operation of the panel unit 20 by the user, and to execute the printing operation based on the read-out information.

Here, the main control circuit 111 in the main circuit board 110 is an example of a processor.

2. Functional Configuration of Panel Unit

Figure 2:
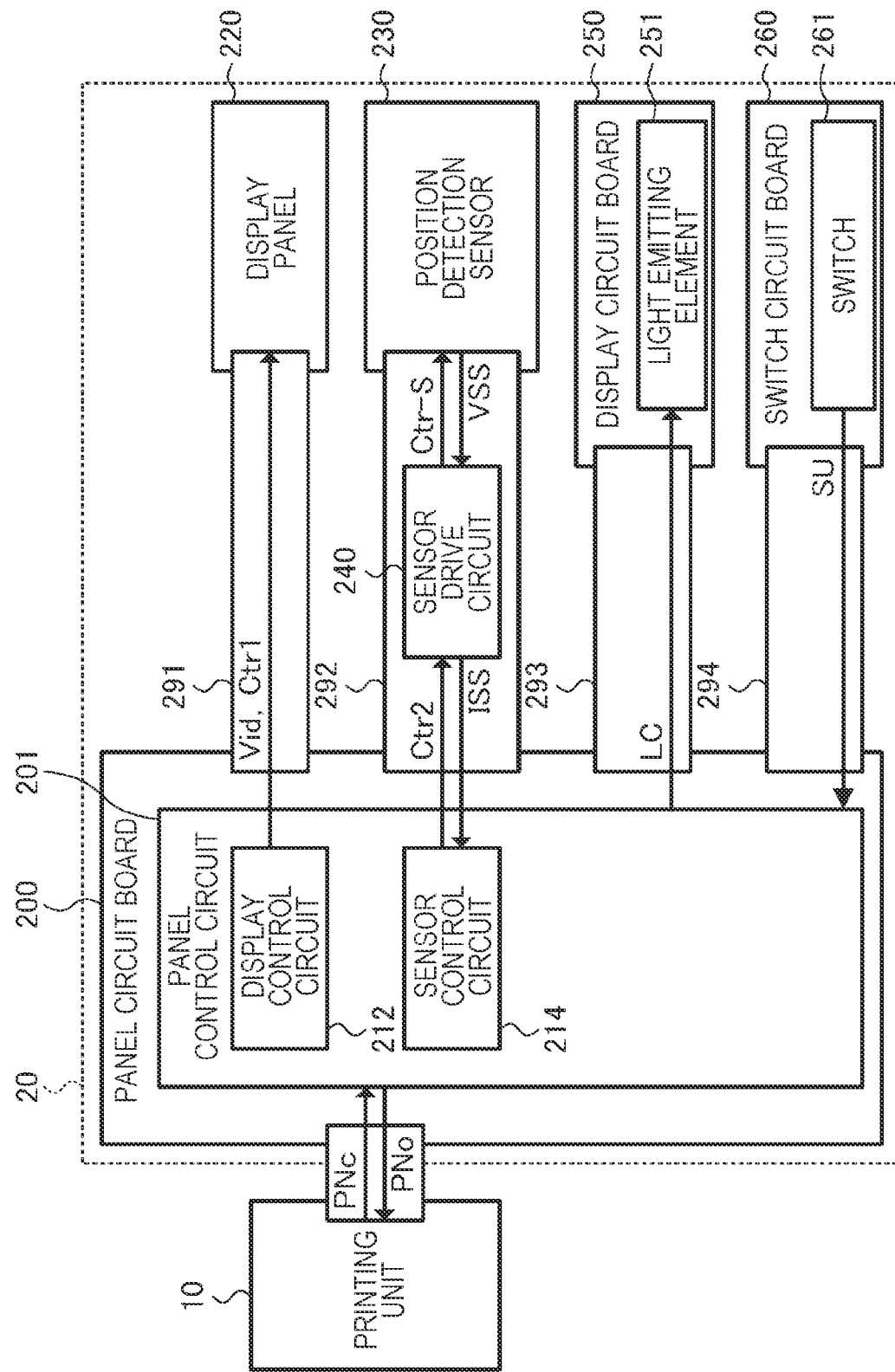
FIG. 2 is a diagram showing an example of a functional configuration of a panel unit.

Next, a functional configuration of the panel unit 20 will be described. FIG. 2 is a diagram showing an example of the functional configuration of the panel unit 20. As shown in FIG. 2, the panel unit 20 includes a panel circuit board 200, a display panel 220, a position detection sensor 230, a sensor drive circuit 240, a display circuit board 250, and a switch circuit board 260.

The panel circuit board 200 includes a panel control circuit 201. Further, the panel control circuit 201 includes a display control circuit 212 that controls the display panel 220 and a sensor control circuit 214 that controls the position detection sensor 230. Then, the panel control circuit 201 controls the display panel 220, the position detection sensor 230, the sensor drive circuit 240, the display circuit board 250, and the switch circuit board 260 based on the panel control signal PNc input from the printing unit 10, and outputs signals output by the display panel 220, the position detection sensor 230, the sensor drive circuit 240, the display circuit board 250, and the switch circuit board 260 as the panel operation signal PNo to the printing unit 10. Such a panel control circuit 201 is configured as one or more integrated circuit devices. The display circuit board 250 and the switch circuit board 260 may be electrically coupled to the relay circuit board 100 without going through the panel control circuit 201.

The display control circuit 212 outputs a control signal Ctrl that defines the operation of the display panel 220 and an image signal Vid indicating an image to be displayed on the display panel 220 to the display panel 220 via a cable 291. Thereby, the display control circuit 212 controls the display panel 220 so that an image based on the image signal Vid is displayed. Here, the image signal Vid may be an analog signal or a digital signal.

Figure 3:
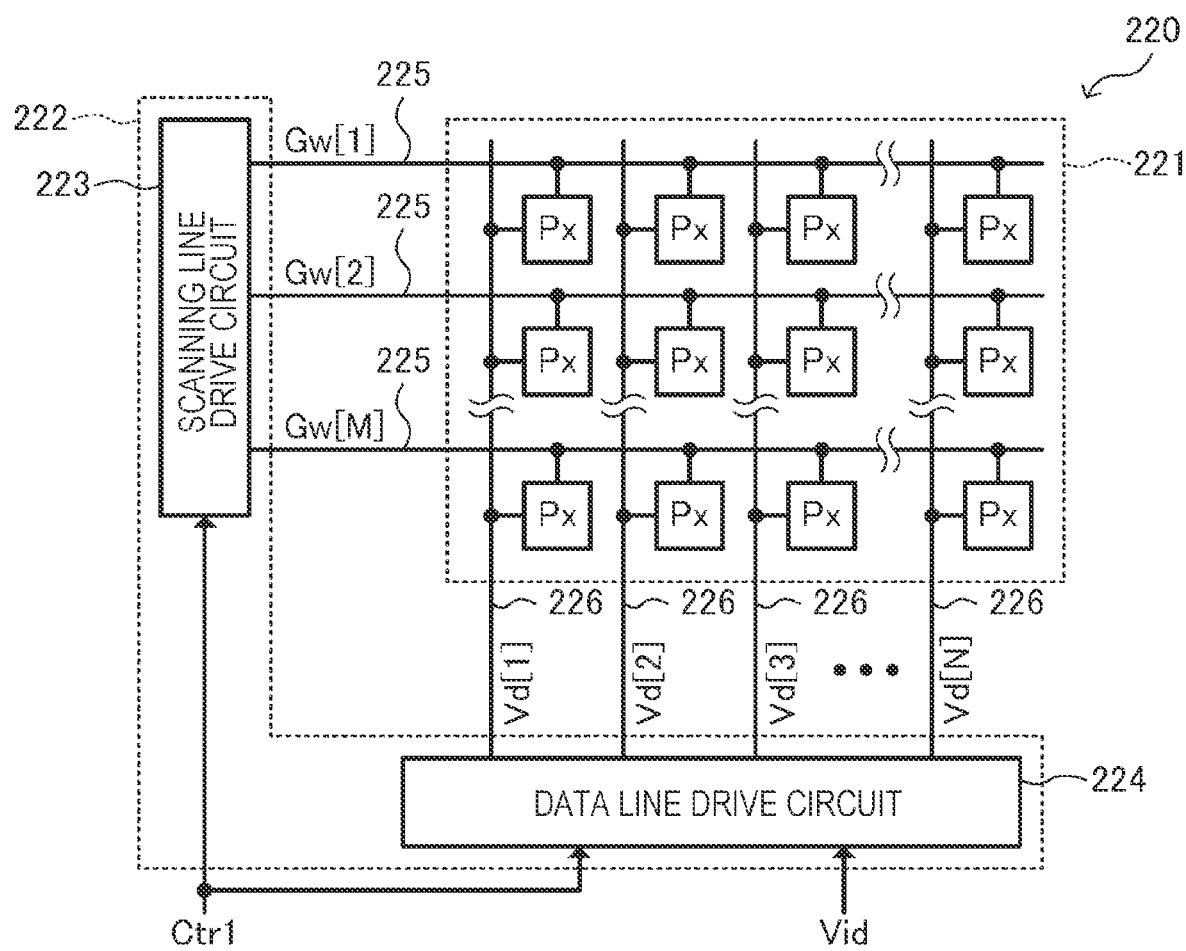
FIG. 3 is a diagram showing an example of a configuration of a display panel.

FIG. 3 is a diagram showing an example of the configuration of the display panel 220. As shown in FIG. 3, the display panel 220 includes a pixel portion 221 provided with a plurality of pixels Px, and a pixel drive portion 222 that drives the pixel portion 221.

The pixel portion 221 includes M rows of scanning lines 225 extending in a first direction, which is a horizontal direction in FIG. 3, and N columns of data lines 226 extending in a second direction, which is a vertical direction in FIG. 3 orthogonal to the first direction. Then, the pixel portion 221 includes M×N pixels Px provided in a matrix of N columns in the first direction and M rows in the second direction corresponding to intersections at which the M rows of scanning lines 225 and the N columns of data lines 226 intersect with each other.

The pixel drive portion 222 includes a scanning line drive circuit 223 and a data line drive circuit 224. The scanning line drive circuit 223 generates a selection signal Gw[m] for selecting the scanning line 225 in the m-th row based on the control signal Ctrl. Then, the scanning line drive circuit 223 outputs the selection signal Gw[m] (m is a natural number satisfying $1 \leq m \leq M$) in an m-th horizontal scanning period among M horizontal scanning periods included in a frame period defined by the control signal Ctrl. Thereby, the scanning line drive circuit 223 can sequentially select the scanning lines 225 in the first row to the M-th row in the frame period.

The data line drive circuit 224 generates a gradation designation signal Vd[n] (n is a natural number satisfying $1 \leq n \leq N$) that designates a gradation to be displayed in the pixel Px based on the image signal Vid, and outputs the gradation designation signal Vd[n] for the data line 226 in the n-th column in the m-th horizontal scanning period in which the scanning line drive circuit 223 selects the scanning line 225 in the m-th row. In the present embodiment, the image signal Vid is a signal including gradation designation signals Vd[1] to Vd[N].

In this way, in the m-th horizontal scanning period, by outputting the selection signal Gw[m] for selecting the scanning line 225 in the m-th row and outputting the gradation designation signal Vd[n] for the data line 226 in the n-th column, the pixel drive portion 222 can display the gradation designated by the gradation designation signal Vd[n] on the pixel Px in the m-th row and the n-th column. As such a display panel 220, for example, a thin flat panel such as a liquid crystal display (LCD) panel or an electro luminescence (EL) panel can be used.

Referring back to FIG. 2, the sensor control circuit 214 outputs a control signal Ctr2 that defines the operation of the sensor drive circuit 240 to the sensor drive circuit 240, which is an integrated circuit device which is chip on film (COF)-mounted on a cable 292. The sensor drive circuit 240 generates a control signal Ctr-S for controlling the drive of the position detection sensor 230 based on the input control signal Ctr2, and outputs the control signal Ctr-S to the position detection sensor 230. That is, the sensor control circuit 214 controls the drive of the position detection sensor 230 via the sensor drive circuit 240. When the position detection sensor 230 is driven by the control signal Ctr-S, the position detection sensor 230 detects the contact of an object such as a finger or a pen with the position detection sensor 230. Then, the position detection sensor 230 generates a detection signal VSS indicating a result of the detection and outputs the detection signal VSS to the sensor drive circuit 240. The sensor drive circuit 240 calculates a contact position of the object with respect to the position detection sensor 230 based on the detection signal VSS, and generates a contact position signal ISS indicating the contact position. The sensor drive circuit 240 outputs the generated contact position signal ISS to the sensor control circuit 214.

Figure 4:
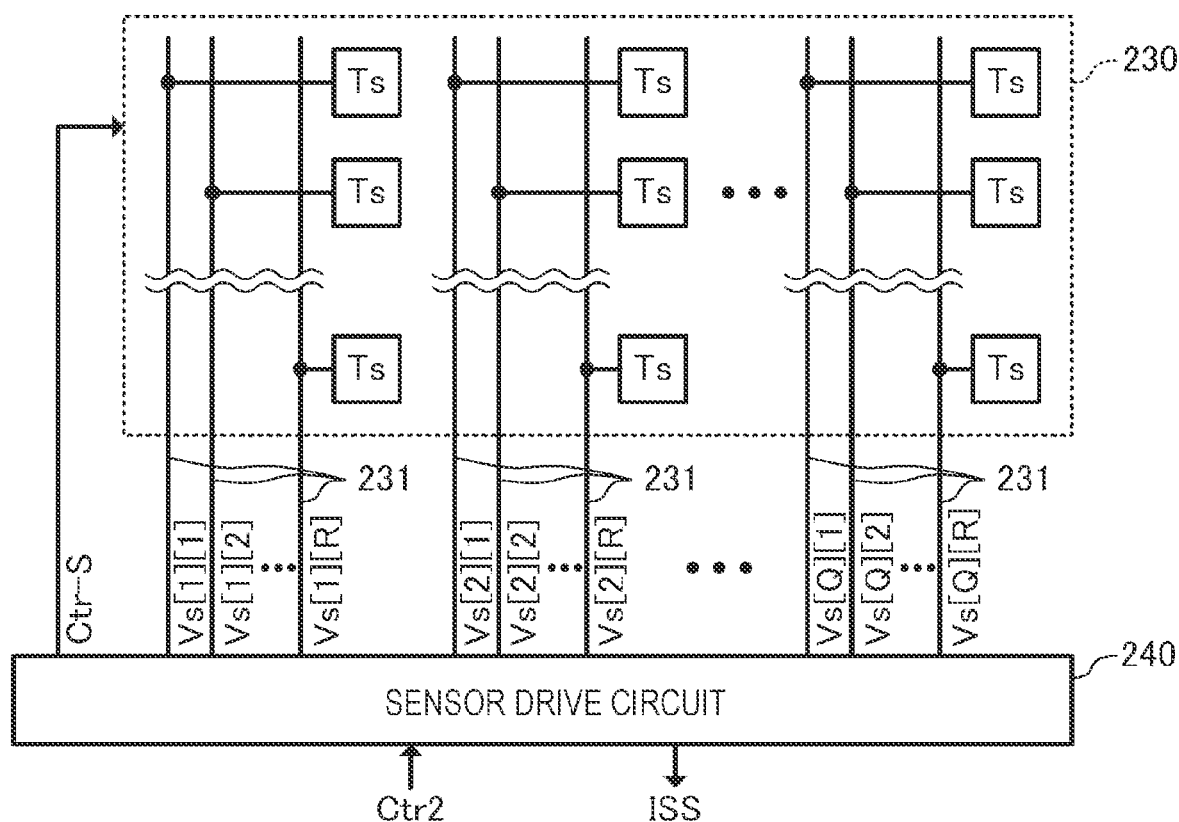
FIG. 4 is a diagram showing an example of a configuration of a position detection sensor and a sensor drive circuit.

FIG. 4 is a diagram showing an example of the configuration of the position detection sensor 230 and the sensor drive circuit 240. As shown in FIG. 4, the position detection sensor 230 includes Q×R sensors Ts provided in a matrix of Q columns in a third direction, which is the horizontal direction in FIG. 4, and R rows in a fourth direction, which is the vertical direction in FIG. 4 orthogonal to the third direction, and Q×R detection lines 231 corresponding to the Q×R sensors Ts in a one-to-one manner.

Each of sensors Ts includes a capacitive element. Then, when an object comes into contact with the sensor Ts, the potentials of two electrodes of the capacitive elements provided corresponding to the sensor Ts fluctuate.

The sensor drive circuit 240 generates a control signal Ctr-S based on the control signal Ctr2, and outputs the generated control signal Ctr-S to the position detection sensor 230. Here, the control signal Ctr-S is a signal instructing the sensor Ts[q] [r] in the q-th row and r-th column to output a detection signal Vs[q] [r] indicating the potential of one of the two electrodes of each sensor Ts to the detection line 231 provided corresponding to the sensor Ts[q] [r]. Thereby, the sensor drive circuit 240 can receive Q×R detection signals Vs supplied from the Q×R sensors Ts. The detection signal VSS described above is, for example, a signal including Q×R detection signals Vs. Then, the sensor drive circuit 240 generates a contact position signal ISS based on the Q×R detection signals Vs included in the detection signal VSS, and outputs the generated contact position signal ISS to the panel control circuit 201. That is, the position detection sensor 230 in the present embodiment is an example of a so-called capacitive position detection sensor that calculates the contact position of an object according to a change in the potential of the capacitive element of the sensor Ts.

Referring back to FIG. 2, the display circuit board 250 includes a light emitting element 251. Then, the panel control circuit 201 outputs a light emission control signal LC for controlling the light emitting element 251 in the display circuit board 250. The light emitting element 251 turns on, turns off, or blinks according to the operating state of the printing device 1. That is, the light emitting element 251 is electrically coupled to the panel circuit board 200 and displays the operating states of the printing device 1 and the printing unit 10, and the display circuit board 250 includes the light emitting element 251 that displays the operating states of the printing device 1 and the printing unit 10. Although FIG. 2 shows only the case where the display circuit board 250 includes one light emitting element 251, the display circuit board 250 may include a plurality of light emitting elements 251. Further, as such a light emitting element 251, for example, a light emitting diode (LED) element can be used.

The switch circuit board 260 includes a switch 261. When the switch 261 is pressed, a switch control signal SU is supplied to the panel control circuit 201. Then, the panel control circuit 201 activates the printing device 1 according to the logic level, time, and the like of the switch control signal SU, and also stops the operation of the printing device 1. That is, the switch 261 is electrically coupled to the panel circuit board 200 and activates the printing device 1 and the printing unit 10, and the switch circuit board 260 includes the switch 261 that activates the printing device 1 and the printing unit 10.

As described above, the panel unit 20 includes the display panel 220 that displays various information, the position detection sensor 230 that detects the contact position of an object such as a finger or a pen, and the panel circuit board 200 on which the panel control circuit 201 electrically coupled to the position detection sensor 230 and the display panel 220 is mounted.

3. Structure of Printing Device

Next, the structure of the printing device 1 will be described. Here, in describing the structure of the printing device 1, the front-rear direction of the printing device 1 may be referred to as an X direction, the left-right direction of the printing device 1 may be referred to as a Y direction, and the vertical direction, which is the up-down direction of the printing device 1, may be referred to as a Z direction. Further, when the orientations of the X direction, the Y direction, and the Z direction are specified, the tip end side of the arrow indicating the X direction shown in the drawing may be referred to as a +X side, and the starting point side thereof may be referred to as a −X side, the tip end side of the arrow indicating the Y direction shown in the drawing may be referred to as a +Y side, and the starting point side thereof may be referred to as a −Y side, and the tip end side of the arrow indicating the Z direction shown in the drawing may be referred to as a +Z side, and the starting point side thereof may be referred to as a −Z side.

Figure 5:
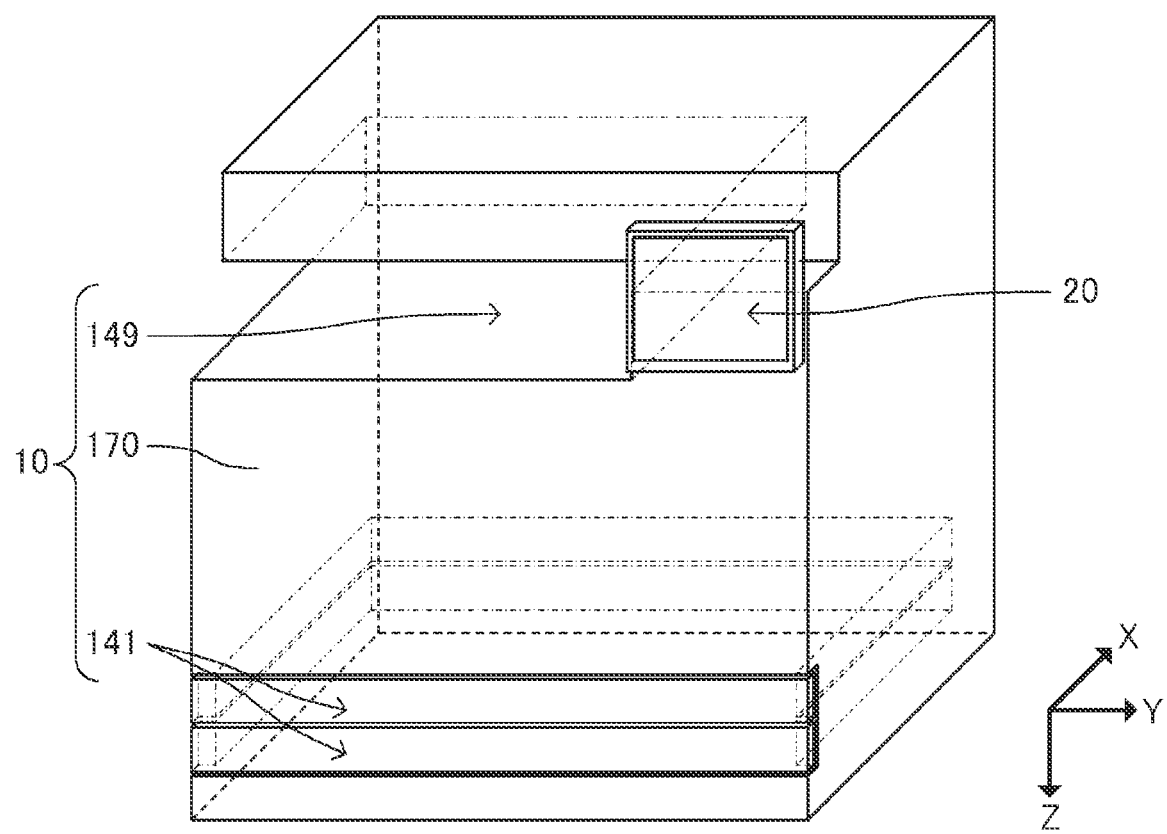
FIG. 5 is a diagram showing an external structure of the printing device.

FIG. 5 is a diagram showing an external structure of the printing device 1. As shown in FIG. 5, the printing device 1 includes the printing unit 10 and the panel unit 20. The panel unit 20 is rotatably attached to the +Z side, which is the side surface on the −X side of the housing 170 in the printing device 1.

Figure 6:
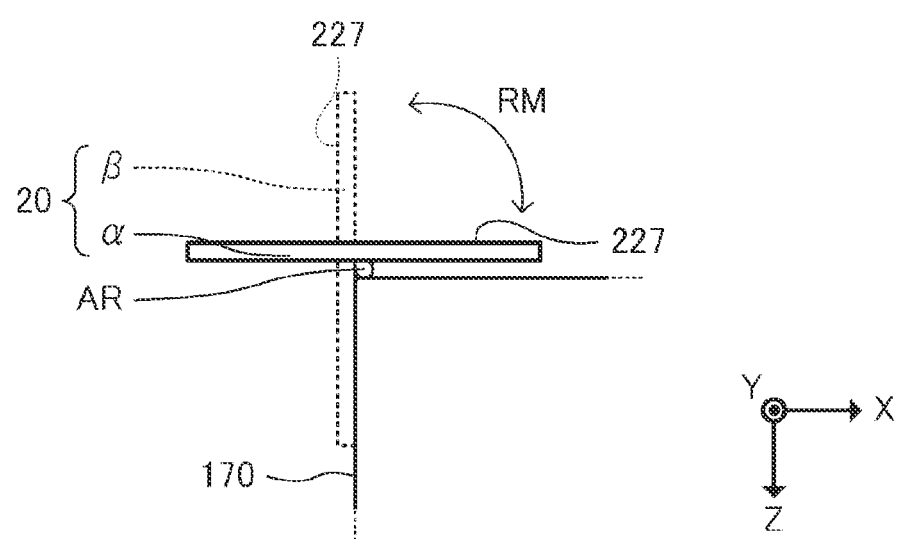
FIG. 6 is a diagram for describing an example of an attachment state of a panel unit attached to a housing.

FIG. 6 is a diagram for describing an example of an attachment state of the panel unit 20 attached to the housing 170. As shown in FIG. 6, the panel unit 20 is rotatably attached to the housing 170 via an attachment portion AR. Specifically, in the present embodiment, the panel unit 20 is rotatably attached to the housing 170 of the printing unit 10 with the attachment portion AR as a rotation axis within the range of a movable range RM so as to take an attachment state α in which a display surface 227 of the display panel 220 described above and the position detection sensor 230 extend along a plane formed by the X direction, which is the front-rear direction of the printing device 1, and the Y direction, which is the left-right direction of the printing device 1, and an attachment state β in which the display surface 227 of the display panel 220 described above and the position detection sensor 230 extend along a plane formed by the Y direction, which is the left-right direction of the printing device 1, and the Z direction, which is the up-down direction and the vertical direction of the printing device 1.

That is, the panel unit 20 is rotatably attached to the housing 170 of the printing unit 10 so as to take the attachment state α in which the displayed contents of the display panel 220 of the panel unit 20 can be visually recognized by the user and the contents of the display panel 220 can be visually recognized when the panel unit 20 is viewed from the upper side to the lower side of the printing device 1, that is, from the −Z side to the +Z side, and the attachment state β in which the contents of the display panel 220 can be visually recognized by the user when the panel unit 20 is viewed from the front to the rear of the printing device 1, that is, from the −X side to the +X side.

Here, in view of improving the convenience of the user who operates the printing device 1, the movable range RM of the panel unit 20 rotatably attached to the housing 170 is preferably wide, specifically, it is preferable that in the attachment state α, a normal direction of the display surface 227 of the display panel 220 and the position detection sensor 230 is upward along the substantially vertical direction and faces the +Z side of the printing device 1, and in the attachment state β, the normal direction of the display surface 227 of the display panel 220 and the position detection sensor 230 faces the −X side of the printing device 1 corresponding to the user side where the user is located in the printing device 1 along the horizontal direction.

However, the movable range RM of the panel unit 20 rotatably attached to the housing 170 is not limited to the above-mentioned range, and the information displayed on the display panel 220 of the panel unit 20 provided so as to be rotatable by the user who operates the printing device 1 may be rotatable within a visible range. That is, in the attachment state α, an angle formed by a plane extending in the horizontal direction and formed by the X direction and the Y direction and a direction in which the display panel 220 and the position detection sensor 230 of the panel unit 20 extend may be 45 degrees or less, and in the attachment state β, the angle formed by the plane extending in the horizontal direction and formed by the X direction and the Y direction and the direction in which the display panel 220 and the position detection sensor 230 of the panel unit 20 extend may be 45 degrees or more. In other words, the panel unit 20 may be rotatably attached to the housing 170 of the printing unit 10 so as to take the attachment state α in which the angle formed by the horizontal direction and a normal direction of the display panel 220 and the position detection sensor 230 is larger than the angle formed by the vertical direction and the normal direction of the display panel 220 and the position detection sensor 230 and the attachment state β in which the angle formed by the horizontal direction and the normal direction of the display panel 220 and the position detection sensor 230 is smaller than the angle formed by the vertical direction and the normal direction of the display panel 220 and the position detection sensor 230.

Here, the attachment state α is an example of a first attachment state, and the attachment state β is an example of a second attachment state.

Figure 7:
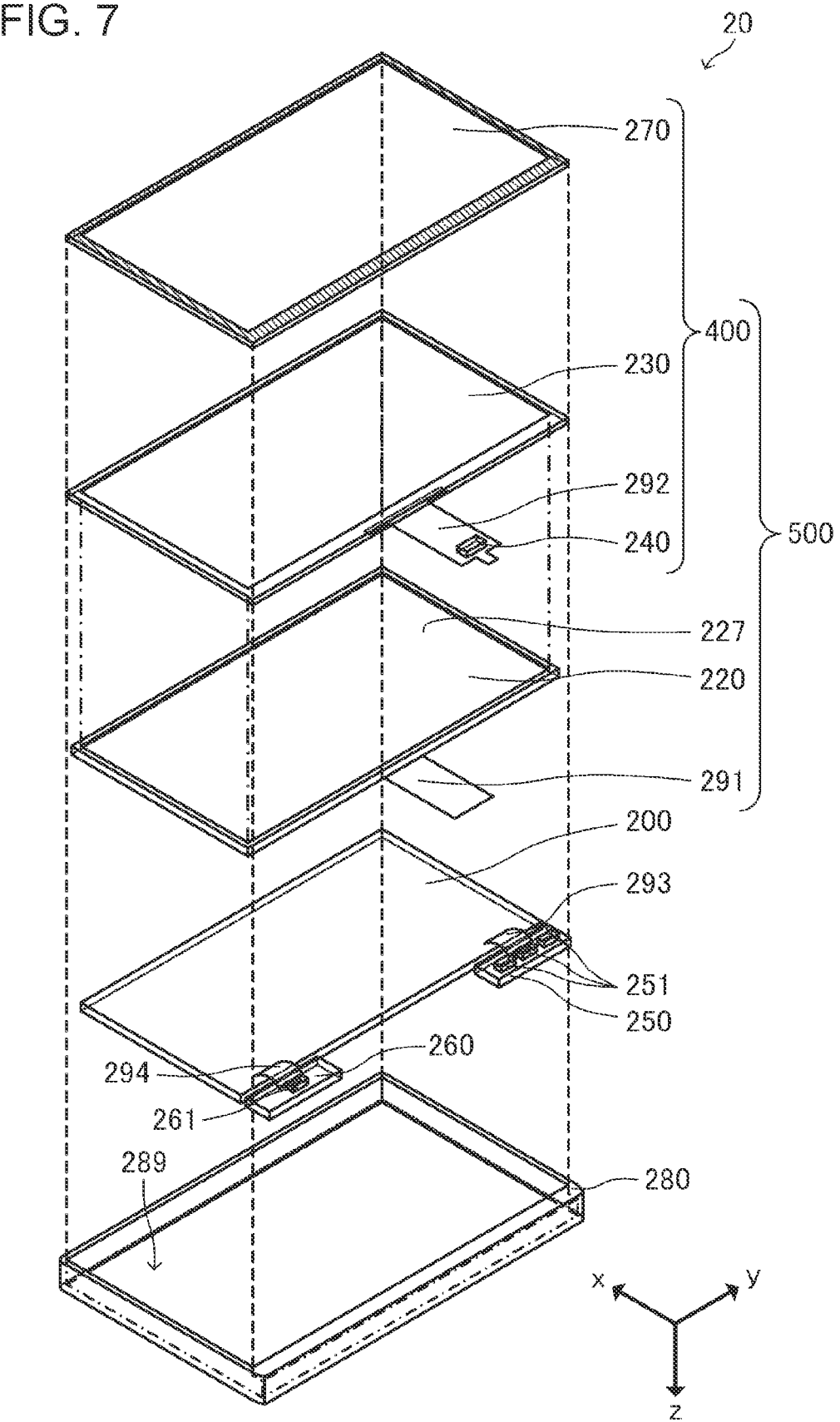
FIG. 7 is a diagram for describing a structure of the panel unit.

Next, an example of a specific structure of the panel unit 20 rotatably attached to the housing 170 as described above will be described. FIG. 7 is a diagram for describing the structure of the panel unit 20. Here, in describing the structure of the panel unit 20, in the following description, an x direction, a y direction, and a z direction which are independent of the above-mentioned X direction, Y direction, and Z direction and are orthogonal to each other are used. Further, when the orientations of the x direction, the y direction, and the z direction are specified, the tip end side of the arrow indicating the x direction shown in the drawing may be referred to as a +x side, and the starting point side thereof may be referred to as a −x side, the tip end side of the arrow indicating the y direction shown in the drawing may be referred to as a +y side, and the starting point side thereof may be referred to as a −y side, and the tip end side of the arrow indicating the z direction shown in the drawing may be referred to as a +z side, and the starting point side thereof may be referred to as a −z side.

As shown in FIG. 7, the panel unit 20 includes a cover glass 270 and a panel housing 280 in addition to the panel circuit board 200, the display panel 220, the position detection sensor 230, the display circuit board 250, and the switch circuit board 260 described above.

The position detection sensor 230 is a substantially rectangular plate-shaped member extending in a plane formed by the x direction and the y direction, and is a so-called capacitive sensor that calculates the contact position of an object according to a change in the potential of the capacitive element as described above. The cable 292 on which the sensor drive circuit 240 is COF-mounted is attached to the side of the position detection sensor 230 on the −x side.

The cover glass 270 is located on the −z side of the position detection sensor 230. The cover glass 270 is a substantially rectangular plate-shaped member having the same size as the position detection sensor 230 and extending in a plane formed by the x direction and the y direction, and is fixed to the position detection sensor 230 with an adhesive (not shown) or the like so as to be laminated. The cover glass 270 functions as a protective member that protects the position detection sensor 230 from scratches and impacts. Here, in the following description, a configuration in which the position detection sensor 230 and the cover glass 270 are laminated and fixed with an adhesive or the like is referred to as a touch sensor 400. The touch sensor 400 in which the cover glass 270 is laminated on the position detection sensor 230 which is a capacitive sensor is an example of a capacitive touch sensor.

Figure 8:
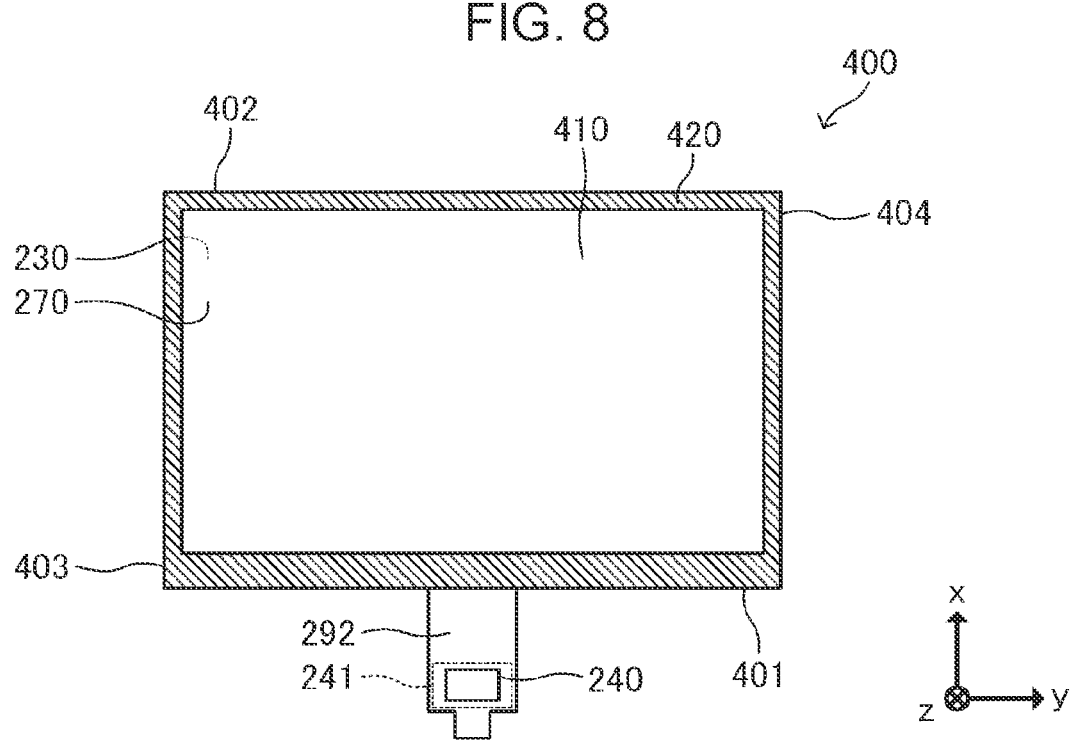
FIG. 8 is a view of a touch sensor when viewed from a −z side.
Figure 9:
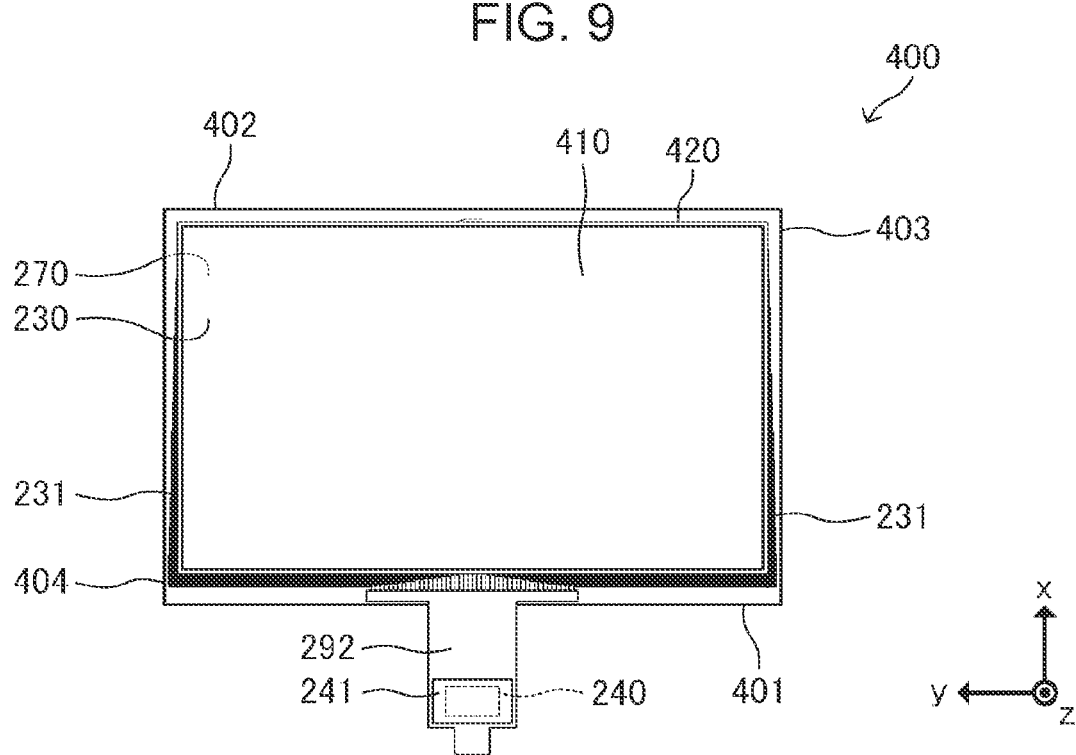
FIG. 9 is a view of the touch sensor when viewed from a +z side.

Here, an example of the structure of the touch sensor 400 will be described with reference to FIGS. 8 and 9. FIG. 8 is a view of the touch sensor 400 when viewed from the −z side, and FIG. 9 is a view of the touch sensor 400 when viewed from the +z side. That is, FIG. 8 corresponds to a view of the touch sensor 400 when viewed from the surface of the cover glass 270 side, and FIG. 9 corresponds to a view of the touch sensor 400 when viewed from the position detection sensor 230 side.

As shown in FIGS. 8 and 9, the touch sensor 400 has a substantially rectangular shape including a side 401, a side 402 located on the +x side of the side 401 and facing the side 401 along the x direction, a side 403 intersecting both the side 401 and the side 402, and, and a side 404 located on the +y side of the side 403 and facing the side 403 along the y direction.

The cable 292 is electrically coupled to the side 401 of the touch sensor 400. The touch sensor 400 is electrically coupled to the panel circuit board 200 via this cable 292. The sensor drive circuit 240 is COF-mounted on the surface of the cable 292 on the −z side and a metal plate 241 is located in an area located facing the COF-mounted sensor drive circuit 240, which is the surface of the cable 292 on the +z side, via the cable 292.

Further, the touch sensor 400 includes an operation area 410 that receives an input of operation information by the user and a frame area 420 that is provided around the operation area 410 and does not receive the input of the operation information by the user.

The operation area 410 is provided with transparent wiring (not shown) formed of, for example, indium tin oxide (ITO), and includes the above-described Q×R sensors Ts provided in a matrix with the x direction as the third direction and the y direction as the fourth direction. On the other hand, the frame area 420 is provided with a detection line 231 that electrically couples each of the Q×R sensors Ts provided in the operation area 410 to the sensor drive circuit 240. That is, in the frame area 420, a wiring for propagating the signal detected in the operation area 410 by the operation of the user is located. Meanwhile, the area of the cover glass 270 corresponding to the frame area 420 may be colored in any color such as black. Thereby, the boundary between the operation area 410 and the frame area 420 can be clearly notified to the user.

Referring back to FIG. 7, the display panel 220 is located on the +z side of the position detection sensor 230 so that the display surface 227 is on the −z side. Such a display panel 220 is a substantially rectangular plate-shaped member extending in a plane formed by the x direction and the y direction, and is provided so as to overlap the operation area 410. That is, the position detection sensor 230 and the display panel 220 are laminated along the z direction. In addition, the cable 291 electrically coupled to the panel circuit board 200 is coupled to the side of the display panel 220 on the −x side.

Here, in the following description, a configuration in which the touch sensor 400 including the position detection sensor 230 and the display panel 220 are laminated along the z direction is referred to as a touch panel 500. That is, the touch panel 500 including the touch sensor 400, which is a capacitive touch sensor, and the display panel 220 functions as a capacitive touch panel.

The panel circuit board 200 is located on the +z side of the display panel 220. Then, since the panel circuit board 200 is electrically coupled to the position detection sensor 230 via the cable 292 and electrically coupled to the display panel 220 via the cable 291, the panel control circuit 201 included in the panel circuit board 200 controls the operation of the touch panel 500 including the display panel 220 and the position detection sensor 230.

The display circuit board 250 is located on the −x side of the panel circuit board 200. Three light emitting elements 251 are provided on the surface of the display circuit board 250 on the −z side. Further, the switch circuit board 260 is located on the −x side of the panel circuit board 200 and on the −y side of the display circuit board 250. The switch 261 is provided on the surface of the switch circuit board 260 on the −z side. The display circuit board 250 is electrically coupled to the panel circuit board 200 via a cable 293, and the switch circuit board 260 is electrically coupled to the panel circuit board 200 via a cable 294.

The panel housing 280 has a substantially rectangular parallelepiped shape having a storage space 289 with one surface on the −z side open, and is composed of a forming member obtained by molding, for example, resin or the like. The touch panel 500, the panel circuit board 200, the display circuit board 250, and the switch circuit board 260 described above are stored in the storage space 289 of the panel housing 280. In this case, since the cover glass 270 of the touch panel 500 is provided so as to cover the open side of the storage space 289, the information displayed on the display panel 220 is notified to the user, and the user's operation information is detected by the position detection sensor 230.

Figure 10:
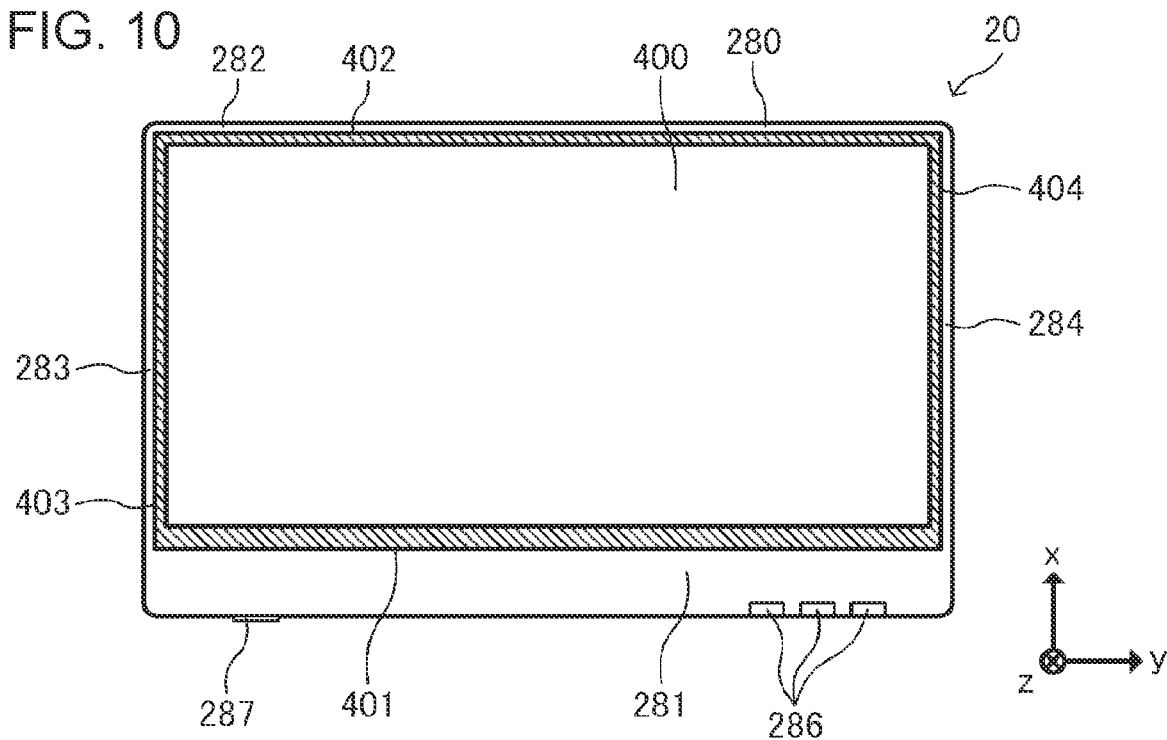
FIG. 10 is a view of the panel unit when viewed from the −z side.
Figure 11:
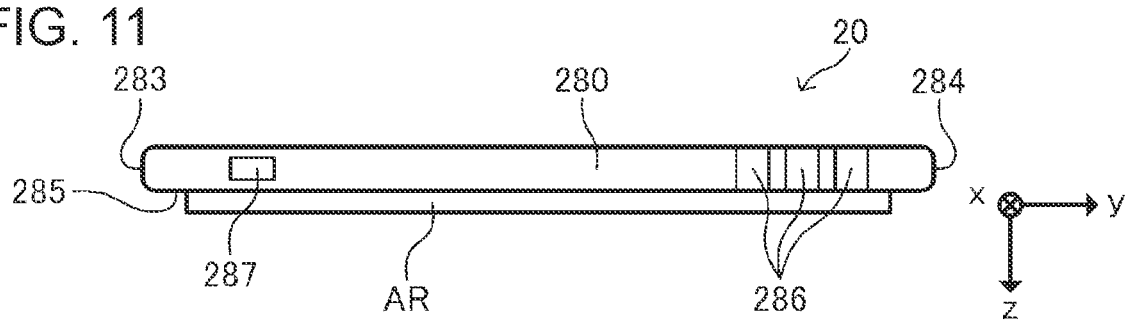
FIG. 11 is a view of the panel unit when viewed from a −x side.

FIG. 10 is a view of the panel unit 20 in a state where the position detection sensor 230, the display panel 220, the panel circuit board 200, the display circuit board 250, and the switch circuit board 260 are stored in the panel housing 280 when viewed from the −z side. FIG. 11 is a view of the panel unit 20 when viewed from the −x side, and FIG. 12 is a view of the panel unit 20 when viewed from the +y side.

As shown in FIG. 10, the touch sensor 400 is stored in the panel housing 280 such that the side 401 and the side 402 are located facing each other along the x direction so that the side 401 is on the −x side and the side 402 is on the +x side, and the side 403 and the side 404 are located facing each other along the y direction so that the side 403 is on the −y side and the side 404 is on the +y side.

Specifically, the panel housing 280 includes housing side portions 281, 282, 283, and 284 and a storage space 289 including the housing side portions 281, 282, 283, and 284. Then, the touch sensor 400 is stored in the storage space 289 such that the side 401 of the touch sensor 400 is located along the housing side portion 281, the side 402 of the touch sensor 400 is located along the housing side portion 282, the side 403 of the touch sensor 400 is located along the housing side portion 283, and the side 404 of the touch sensor 400 is located along the housing side portion 284.

Figure 12:
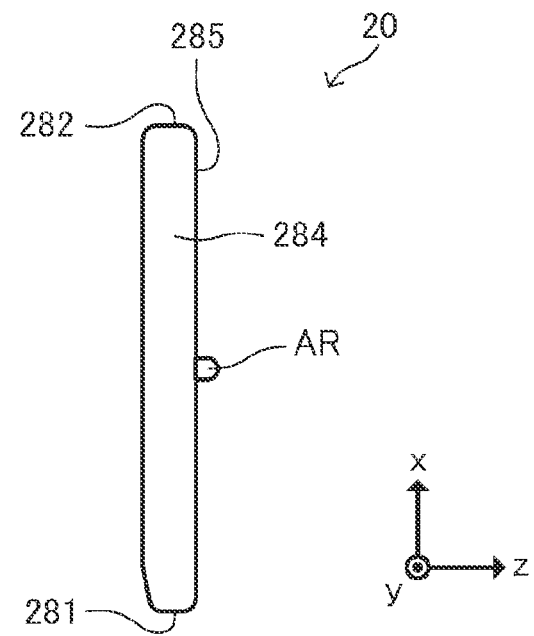
FIG. 12 is a view of the panel unit when viewed from a +y side.

As shown in FIGS. 11 and 12, in the panel unit 20, the attachment portion AR is provided at the central portion of a bottom surface 285 of the panel housing 280 located facing the cover glass 270. In the panel unit 20 including the panel housing 280 in which the touch sensor 400 is stored, the attachment portion AR is a protrusion that is located at the central portion of the panel housing 280 in the direction from the side 401 to the side 402, that is, the direction along the x direction, and extends along the y direction. The panel unit 20 is rotatably attached to the printing unit 10 by rotatably attaching the attachment portion AR to the housing 170. That is, the panel unit 20 is rotatably attached to the printing unit 10 at the central portion of the panel housing 280 in the direction from the side 401 to the side 402.

Here, the fact that the attachment portion AR is located at the central portion of the panel housing 280 in the direction from the side 401 to the side 402, that is, the direction along the x direction means that, preferably, when the panel unit 20 is viewed along the z direction, the attachment portion AR is located such that at least a part thereof overlaps a point where a distance between the side surface on the −x side and the side surface on the +x side of the panel housing 280 is equal. However, the attachment portion AR may be located at least in an area between a first virtual straight line where a distance between a virtual straight line having the same distance between the side surface on the −x side and the side surface on the +x side of the panel housing 280 and the side surface on the −x side of the panel housing 280 is equal and a second virtual straight line where a distance between the virtual straight line having the same distance between the side surface on the −x side and the side surface on the +x side of the panel housing 280 and the side surface on the +x side of the panel housing 280 is equal. That is, the central portion of the panel housing 280 in the direction from the side 401 to the side 402, that is, the direction along the x direction means the area between the above-mentioned first virtual straight line and the above-mentioned second virtual straight line. Then, the panel unit 20 and the printing unit 10 are electrically coupled to each other by inserting the cable 210 through the inside of the attachment portion AR.

Further, as shown in FIGS. 10 and 11, a display window 286 and an operation switch 287 are provided on the housing side portion 281 of the panel housing 280.

The display window 286 is a resin member that transmits light, for example, a transparent color or a milky white color, and is located on the +y side of the housing side portion 281 such that at least a part of the panel unit 20 can be visually recognized when the panel unit 20 is viewed from the −z side along the z direction. In the storage space 289 of the panel housing 280 where the display window 286 is located, the light emitting element 251 of the display circuit board 250 stored in the panel housing 280 is located. Thereby, when the light emitting element 251 is turned on, turned off, or blinks according to the operating state of the printing device 1, the light generated by the light emitting element 251 is notified to the user located outside the panel unit 20 via the display window 286.

The operation switch 287 is located on the side surface of the panel housing 280 extending in a direction intersecting the extending direction of the display surface 227 of the display panel 220, which is the end of the panel housing 280 when the panel unit 20 is viewed from the −z side along the z direction and when viewed from the direction along the normal direction of the touch sensor 400. Then, when the user operates the operation switch 287, the switch 261 of the switch circuit board 260 operates, whereby operation information of the operation switch 287 by the user is input to the panel unit 20.

Further, the cables 291 and 292 are curved in the vicinity of the housing side portion 281 which is the end of the panel housing 280 and between the display circuit board 250 and the switch circuit board 260, and electrically couple the touch sensor 400 and the panel circuit board 200 to each other. Then, when the display control circuit 212 of the panel control circuit 201 displays various information on the display panel 220 and the detection signal VSS generated by the contact of an object such as a finger or a pen with the touch sensor 400 is input to the sensor drive circuit 240, the sensor drive circuit 240 generates the contact position signal ISS based on the detection signal VSS and outputs the contact position signal ISS to the sensor control circuit 214 included in the panel control circuit 201. Thereby, operation information corresponding to the operation of the touch panel 500 by the user is input to the panel control circuit 201.

That is, the panel unit 20 includes a surface on which the cover glass 270 where the touch sensor 400, which is a capacitive touch sensor, receives an input of operation information is located, and a bottom surface 285 which is located facing the cover glass 270 and does not receive an input of operation information. The surface on which the cover glass 270 where the touch sensor 400, which is a capacitive touch sensor, receives the input of the operation information is located is an example of a first surface, and the bottom surface 285 which is located facing the cover glass 270 and does not receive the input of the operation information is an example of a second surface.

The panel unit 20 configured as described above is attached to the printing unit 10 so that the cover glass 270 is on the −Z side, the bottom surface 285 is on the +Z side, the side 401 of the touch sensor 400 is located on the −X side, and the side 402 of the touch sensor 400 is located on the +X side in the attachment state α in which the display surface 227 of the display panel 220 and the position detection sensor 230 extend along a plane formed by the X direction, which is the front-rear direction of the printing device 1, and the Y direction, which is the left-right direction of the printing device 1, and is attached to the −X side of the housing 170 of the printing unit 10 so that the cover glass 270 is on the −X side, the bottom surface 285 is on the +X side, the side 401 of the touch sensor 400 is located on the +Z side and the side 402 of the touch sensor 400 is located on the −Z side in the attachment state β in which the display surface 227 of the display panel 220 described above and the position detection sensor 230 extend along a plane formed by the Y direction, which is the left-right direction of the printing device 1, and the Z direction, which is the up-down direction and the vertical direction of the printing device 1.

Referring back to FIG. 5, the printing unit 10 includes a medium accommodating portion 141, a medium discharge tray 149, and a housing 170. The medium accommodating portion 141 forms an accommodating space in which the medium before the printing operation is executed is accommodated. Specifically, the medium accommodating portion 141 is located on the +Z side of the housing 170, and is attached such that at least a part of the accommodating space can be pulled out inside the housing 170. The medium discharge tray 149 is located on the −Z side of the housing 170, and the medium after the printing operation is executed is discharged.

In the printing device 1 configured as described above, when the printing operation is executed by the user operating the panel unit 20, the medium accommodated in the medium accommodating portion 141 is transported inside the housing 170. Then, the printing operation is executed on the medium during the period in which the medium is transported inside the housing 170. Thereafter, the medium on which the printing operation is executed is discharged to the medium discharge tray 149.

Figure 13:
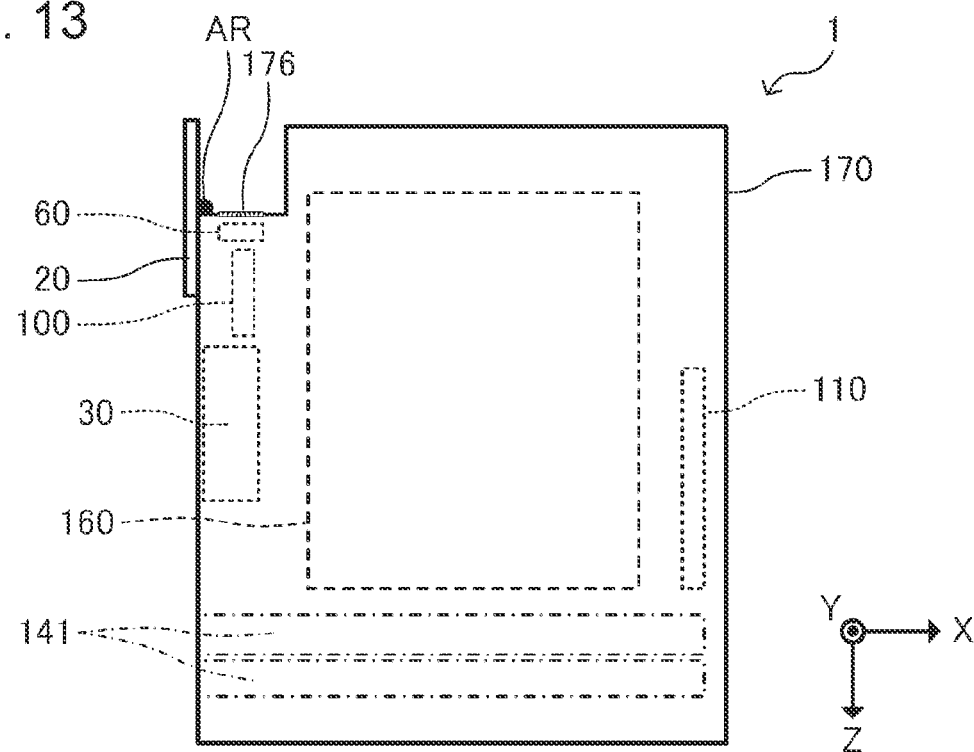
FIG. 13 is a diagram showing an example of an internal structure of the housing.

Here, the internal structure of the housing 170 included in the printing unit 10 will be described. FIG. 13 is a diagram showing an example of the internal structure of the housing 170. As shown in FIG. 13, the housing 170 stores the relay circuit board 100, the main circuit board 110, the printing mechanism 160, and the wireless communication unit 30.

The wireless communication unit 30 and the relay circuit board 100 are located along the side surface on the −X side of the housing 170 to which the panel unit 20 is rotatably attached. Specifically, the wireless communication unit 30 is located on the +Z side of the relay circuit board 100 along the side surface on the −X side of the housing 170, and the relay circuit board 100 is located on the −Z side of the wireless communication unit 30 along the side surface on the −X side of the housing 170. That is, the wireless communication unit 30 and the relay circuit board 100 are located inside the housing 170 and near the side surface of the housing 170 to which the panel unit 20 is attached. The relay circuit board 100 and the wireless communication unit 30 may be located such that at least parts of the relay circuit board 100 and the wireless communication unit 30 overlap each other in the direction along the Y direction.

Further, the main circuit board 110 is located along the side surface on the +X side of the housing 170, which is located facing the side surface on the −X side of the housing 170 to which the panel unit 20 is rotatably attached. That is, the relay circuit board 100 is provided inside the housing 170 in the vicinity of the panel unit 20 with respect to the main circuit board 110. In this case, the relay circuit board 100 is located between the panel unit 20 and the main circuit board 110 when the printing device 1 is viewed along the Y direction. That is, the relay circuit board 100 is provided at a position where the shortest distance between the main circuit board 110 and the relay circuit board 100 is smaller than the shortest distance between the main circuit board 110 and the panel unit 20.

Further, by locating the shortest distance between the relay circuit board 100 and the panel unit 20 so as to be smaller than the shortest distance between the relay circuit board 100 and the main circuit board 110, the wiring length of the cable 210 that electrically couples the panel unit 20 and the relay circuit board 100 to each other can be made shorter than the wiring length of the cable 191 that electrically couples the relay circuit board 100 and the main circuit board 110 to each other.

In the printing device 1 configured as described above, the panel unit 20 having the touch panel 500 for the user to input operation information is provided outside the housing 170, and the wireless communication unit 30 for performing wireless communication with an external device and the connectors CN1 and CN2 to which the wireless communication unit 30 is coupled are provided inside the housing 170. That is, the panel unit 20 is not provided with the wireless communication unit 30 and the connectors CN1 and CN2 to which the wireless communication unit 30 is coupled. Thereby, even when the size of the touch panel 500 is increased, a possibility that the size of the panel unit 20 becomes large is reduced. Therefore, even when the printing device 1 is provided with the large touch panel 500, the possibility that the panel unit 20 becomes large is reduced.

Further, since the connectors CN1 and CN2 to which the wireless communication unit 30 for performing wireless communication with the external device is coupled are provided on the relay circuit board 100 disposed in the vicinity of the panel unit 20, the wireless communication unit 30 can be disposed in the vicinity of the panel unit 20. Thereby, even when the printing device 1 includes the NFC module 31 that performs wireless communication at a short distance of several cm to several tens of cm as the wireless communication unit 30, the NFC module 31 can be provided in the vicinity of the operator who operates the panel unit 20 and at a position where the panel unit 20 does not interfere with wireless communication at a short distance in the NFC module 31. As a result, mutual interference of signals between the panel unit 20 and the NFC module 31 is reduced, and when the user operates the NFC module 31, the possibility that the panel unit 20 interferes with the operation is reduced.

Further, since the wireless communication unit 30 is electrically coupled to the main circuit board 110 via the relay circuit board 100, even when the main circuit board 110 is provided at a position away from the panel unit 20 operated by the operator, the relay circuit board 100 converts the wireless signal received by the wireless communication unit 30 into any signal that is not easily affected by noise, thereby improving the reliability of the signal input to the main circuit board 110. As a result, the operational stability of the printing device 1 can be improved.

Further, in the side surface on the −Z side of the housing 170 to which the panel unit 20 is rotatably attached, a sound emitting hole 176 that emits the operating sound output from the speaker 60 to the outside of the housing 170 is formed in the area on the −Z side where the wireless communication unit 30 and the relay circuit board 100 are located. That is, the housing 170 includes a sound emitting hole 176 that emits the operating sound output from the speaker 60 to the outside of the housing 170. The speaker 60 is located in an internal region of the housing 170 facing the sound emitting hole 176 of the housing 170.

Figure 14:
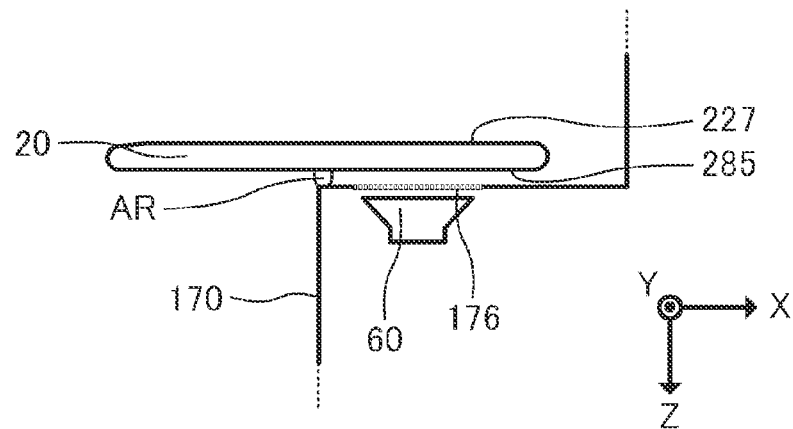
FIG. 14 is a diagram for describing a disposition relationship between a sound emitting hole and the panel unit when the panel unit is in an attachment state α.
Figure 15:
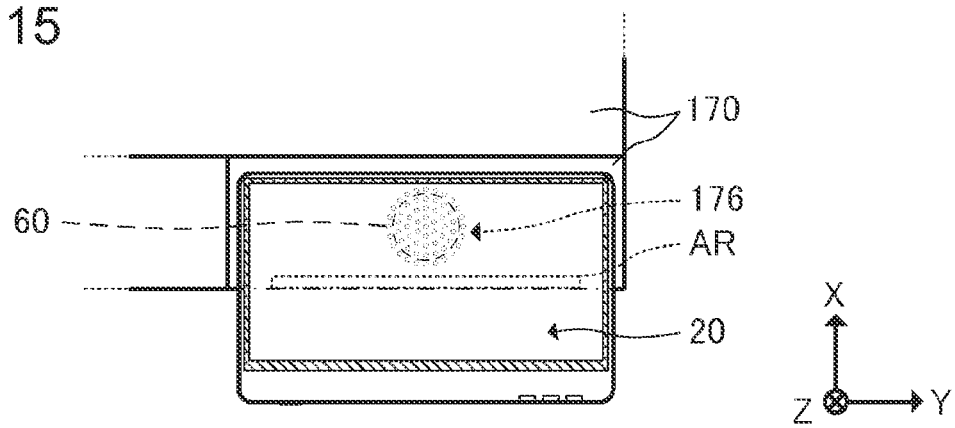
FIG. 15 is a diagram for describing a disposition relationship between the sound emitting hole and the panel unit when the panel unit is in the attachment state α.
Figure 16:
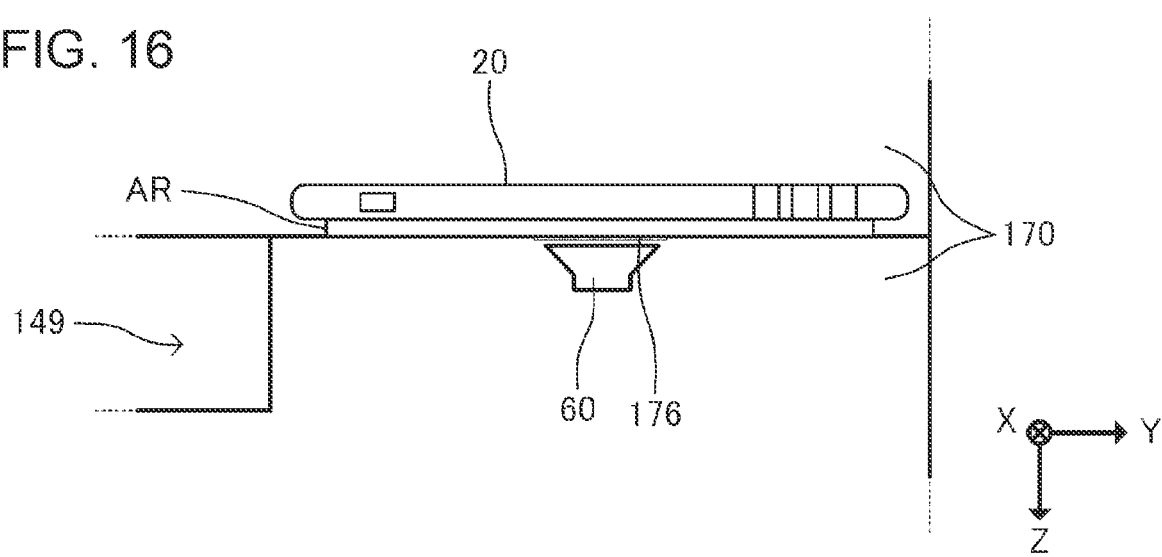
FIG. 16 is a diagram for describing a disposition relationship between the sound emitting hole and the panel unit when the panel unit is in the attachment state α.
Figure 17:
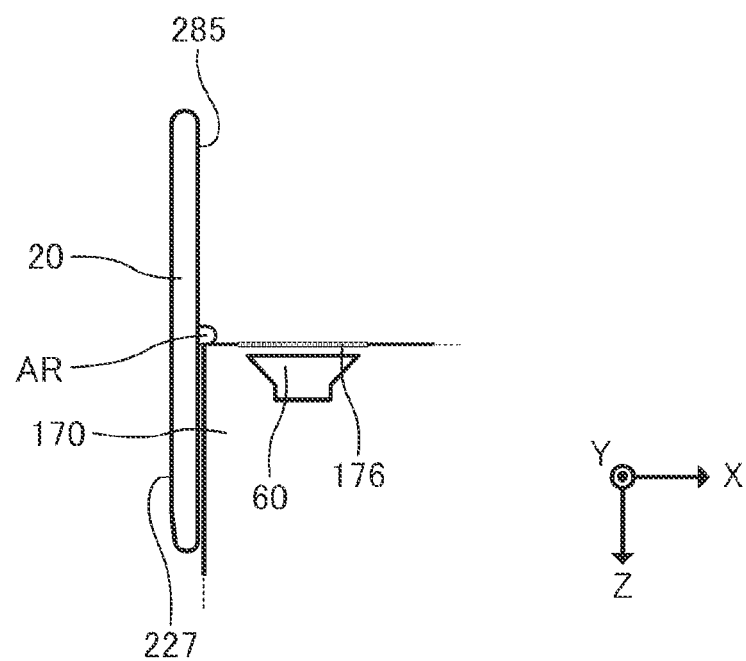
FIG. 17 is a diagram for describing a disposition relationship between the sound emitting hole and the panel unit when the panel unit is in an attachment state β.
Figure 18:
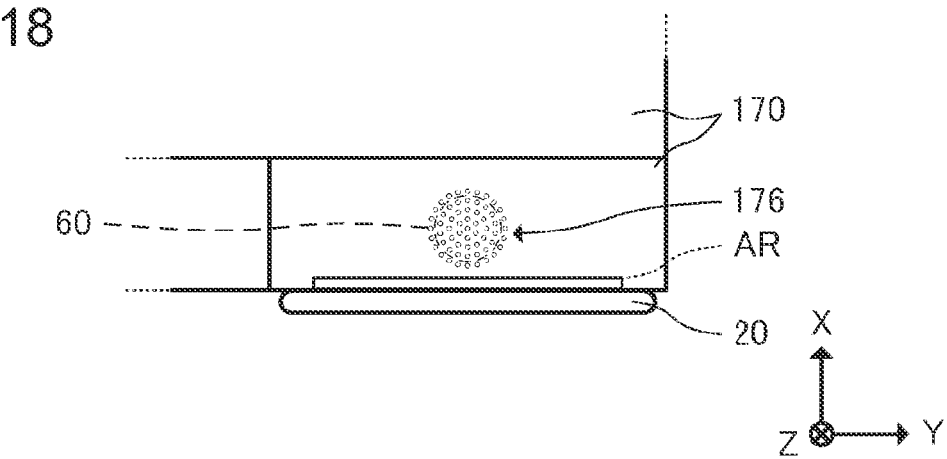
FIG. 18 is a diagram for describing a disposition relationship between the sound emitting hole and the panel unit when the panel unit is in the attachment state β.
Figure 19:
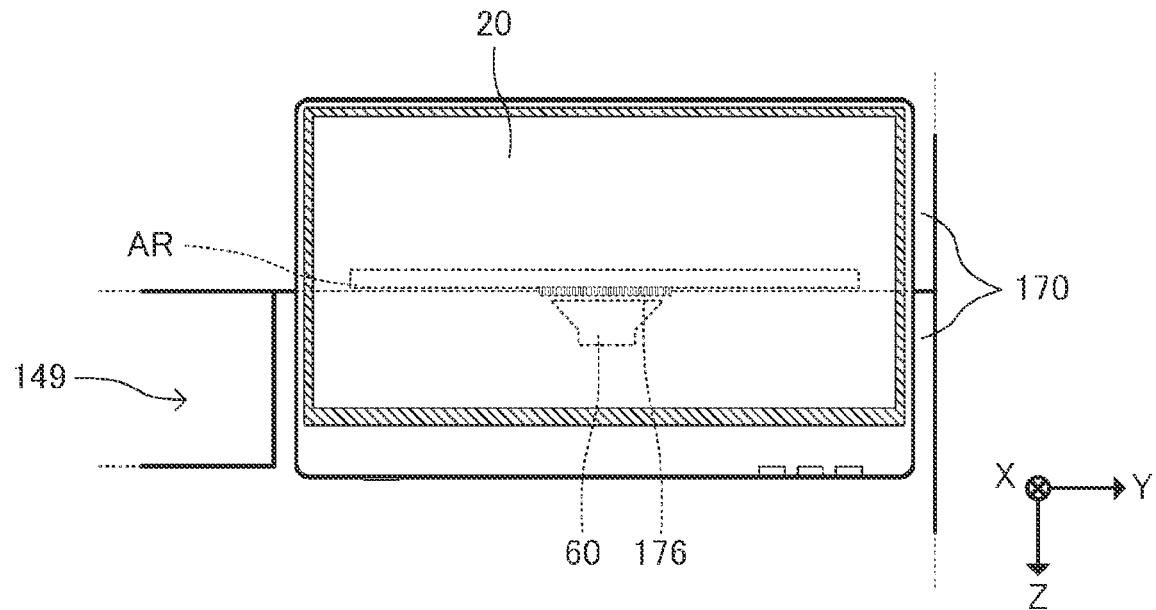
FIG. 19 is a diagram for describing a disposition relationship between the sound emitting hole and the panel unit when the panel unit is in the attachment state β.

Here, specific examples of the disposition relationship between the sound emitting hole 176 that emits the operating sound output from the speaker 60 to the outside of the housing 170 and the panel unit 20 to which the user inputs operation information will be described with reference to FIGS. 14 to 19. FIGS. 14 to 16 are diagrams for describing a disposition relationship between the sound emitting holes 176 and the panel unit 20 when the panel unit 20 is in the attachment state α, and FIGS. 17 to 19 are diagrams for describing a disposition relationship between the sound emitting holes 176 and the panel unit 20 when the panel unit 20 is in the attachment state β. FIGS. 14 and 17 show a case where the printing device 1 is viewed along the Y direction, FIGS. 15 and 18 show a case where the printing device 1 is viewed along the Z direction, and FIGS. 16 and 19 show a case where the printing device 1 is viewed along the X direction.

As shown in FIGS. 14 to 19, the sound emitting hole 176 is in the vicinity where the attachment portion AR of the panel unit 20 is attached to the housing 170 and is provided in the housing 170 so as to be located on the bottom surface 285 side of the panel unit 20. In other words, the panel unit 20 is rotatably attached to the housing 170 such that the sound emitting hole 176 provided in the housing 170 is located on the back surface side of the panel unit 20. That is, the sound emitting hole 176 is on the back surface side of the panel unit 20 and is provided in the housing 170 such that the shortest distance between the sound emitting hole 176 and the surface of the panel unit 20 where the cover glass 270 where the touch sensor 400 receives an input of operation information is located is longer than the shortest distance between the sound emitting hole 176 and the bottom surface 285 that does not receive the input of the user's operation information.

Then, as shown in FIGS. 14 to 16, when the panel unit 20 rotatably attached to the housing 170 is in the attachment state α, the sound emitting hole 176 is located so as to overlap the panel unit 20 when the panel unit 20 is viewed along the Z direction. In other words, when the panel unit 20 is in the attachment state α, the sound emitting hole 176 is located such that at least a part thereof overlaps the panel unit 20 when the panel unit 20 is viewed from the normal direction of the touch sensor 400.

Thereby, the user who operates the panel unit 20 can feel that the operating sound output from the speaker 60 emitted from the sound emitting hole 176 to the outside of the housing 170 is emitted from the panel unit 20. That is, the user can operate the panel unit 20 based on both the visual information displayed on the panel unit 20 and the operating sound emitted from the sound emitting hole 176. As a result, even when the user has a visual or hearing impairment, the panel unit 20 can be operated in the same manner as a healthy person. That is, even when the user has a visual or hearing impairment, the printing device 1 can be operated in the same manner as a healthy person.

Similarly, as shown in FIGS. 17 to 19, when the panel unit 20 rotatably attached to the housing 170 is in the attachment state β, the sound emitting hole 176 is located so as to overlap the panel unit 20 when the panel unit 20 is viewed along the X direction. In other words, when the panel unit 20 is in the attachment state β, the sound emitting hole 176 is located such that at least a part thereof overlaps the panel unit 20 when the panel unit 20 is viewed from the normal direction of the touch sensor 400.

Thereby, the user who operates the panel unit 20 can feel that the operating sound output from the speaker 60 emitted from the sound emitting hole 176 to the outside of the housing 170 is emitted from the panel unit 20. That is, the user can operate the panel unit 20 based on both the visual information displayed on the panel unit 20 and the operating sound emitted from the sound emitting hole 176. As a result, even when the user has a visual or hearing impairment, the panel unit 20 can be operated in the same manner as a healthy person. That is, even when the user has a visual or hearing impairment, the printing device 1 can be operated in the same manner as a healthy person.

As described above, the printing device 1 according to the present embodiment includes the speaker 60 that outputs an operating sound including at least one of an operation sound corresponding to the operation of the panel unit 20 and a state sound indicating the operating state of the printing unit 10, and that is stored in the housing 170. The housing 170 includes the sound emitting hole 176 for emitting the operating sound output from the speaker 60 to the outside of the housing 170. Then, in the printing device 1 according to the present embodiment, when the panel unit 20 rotatably attached to the printing unit 10 is in the attachment state α and the attachment state β, the sound emitting hole 176 of the housing 170 is located such that at least a part of the sound emitting hole 176 overlaps the panel unit 20 when the panel unit 20 is viewed from the normal direction of the touch sensor 400.

In the printing device 1 configured as described above, since the panel unit 20 operated by the operator is not provided with the speaker 60, even when the size of the touch sensor 400 of the panel unit 20 is increased in order to improve the operability of the user, the possibility that the panel unit 20 becomes large is reduced. As a result, even when the user suffers from a symptom accompanied by tremors at the ends of the fingertips and the like, the printing device 1 with excellent operability can be realized. That is, the usability of the printing device 1 is improved.

Further, since the possibility that the panel unit 20 becomes large is reduced, the weight of the panel unit 20 is also reduced. Thereby, the rotatability of the panel unit 20 is improved. Therefore, the angle of the rotatably attached panel unit 20 can be easily changed to an optimum angle that is easy for the user to operate, and the panel unit 20 can be held at the optimum angle. As a result, even when the physical characteristics of the user who uses the printing device 1 and the user is using a wheelchair or the like, it is possible to provide the printing device 1 in which the possibility of deterioration in operability is reduced.

The touch sensor 400 provided in the panel unit 20 in the printing device 1 configured as described above preferably has a large size of 10 inches or more. In other words, the size of the touch sensor 400 in the diagonal direction is preferably 10 inches or more. As described above, in the printing device 1 according to the present embodiment, by providing the speaker 60 in the housing 170 having a configuration different from that of the panel unit 20 and to which the panel unit 20 is rotatably attached, even when the panel unit 20 includes a large touch sensor 400, the possibility that the panel unit 20 becomes large is reduced. Therefore, the panel unit 20 can include a large touch sensor 400 of 10 inches or more. Further, since the panel unit 20 includes a large touch sensor 400 of 10 inches or more, even when the user suffers from a symptom accompanied by tremors at the ends such as fingertips, the printing device 1 with further excellent operability can be realized, and the usability of the printing device 1 is further improved.

Further, in the printing device 1, since the sound emitting hole 176 that emits the operating sound output from the speaker 60 provided inside the housing 170 to the outside of the housing 170 and the panel unit 20 are provided so as to overlap each other in the normal direction of the touch sensor 400, the user can intuitively operate the panel unit 20 based on both the visual information displayed on the panel unit 20 and the operating sound emitted from the sound emitting hole 176. Thereby, it is possible to realize the printing device 1 that can be operated in the same manner as a healthy person even by a user having a visual or hearing impairment.

That is, in the printing device 1 according to the present embodiment, even when the user has a visual or hearing impairment, when the user suffers from a symptom accompanied by tremors at the ends such as fingertips, or when the user is using a wheelchair or the like, it is possible to reduce the possibility of deterioration in operability regardless of the physical characteristics of the user. Thereby, it is possible to provide the printing device 1 with further improved usability as compared with the printing device in the related art.

Here, as shown in FIGS. 14 to 19, it is preferable that at least parts of the sound emitting hole 176 and the panel unit 20 overlap each other in both the attachment state α and the attachment state β when the panel unit 20 is viewed from the normal direction of the touch sensor 400. However, the sound emitting hole 176 and the panel unit 20 may be provided so as to overlap each other in at least one of the case where the panel unit 20 rotatably attached to the printing unit 10 is in the attachment state α and the case where the panel unit 20 is in the attachment state β. That is, in at least one of the attachment state α and the attachment state β, the sound emitting hole 176 may be located such that at least a part thereof overlaps the panel unit 20 when the panel unit 20 is viewed from the normal direction of the touch sensor 400.

Even with such a printing device 1, even when the panel unit 20 includes a large touch sensor, the possibility that the panel unit 20 becomes large can be reduced, and the user can feel that the operating sound output from the speaker 60 stored in the housing 170 is emitted from the panel unit 20. Therefore, it is possible to provide the printing device 1 with further improved usability as compared with the printing device in the related art.

Here, as described above, in the panel unit 20 according to the present embodiment, the touch sensor 400 is a capacitive touch sensor, and the touch panel 500 including the touch sensor 400 is a capacitive touch panel. By using the touch sensor 400 of the panel unit 20 as a capacitive touch sensor and the touch panel 500 as a capacitive touch panel, the touch sensor 400 and the touch panel 500 can be made thinner, which makes it possible to make the panel unit 20 having the touch sensor 400 and the touch panel 500 thinner. Thereby, the operating sound emitted from the sound emitting hole 176 provided on the back surface of the panel unit 20 is more clearly propagated to the operator who operates the panel unit 20. Therefore, even when the user has a hearing impairment, the operability of the printing device 1 is further improved. Further, by using the touch sensor 400 of the panel unit 20 as a capacitive touch sensor and the touch panel 500 as a capacitive touch panel, compared with the case where the touch sensor is a resistive film type, the touch panel 500 can be operated with a smaller force, and the usability of the printing device 1 can be further improved.

Here, in FIGS. 14 to 19, the case where the speaker 60 and the sound emitting hole 176 face each other along the Z direction has been described as an example, but the speaker 60 may be provided at any position as long as the operating sound can be efficiently emitted from the sound emitting hole 176. In this case, a pipe or the like for propagating the operating sound may be provided between the speaker 60 and the sound emitting hole 176. Further, in FIGS. 14 to 19, the case where the sound emitting hole 176 is a plurality of substantially circular through-holes through which the outside and the inside of the housing 170 are inserted has been described as an example, but the shape and number of the sound emitting holes 176 included in the housing 170 are not limited thereto. Further, the sound emitting hole 176 may be provided with a mesh filter member or the like for preventing dust or the like from entering the inside of the housing 170 via the through-hole.

Referring back to FIG. 13, the printing mechanism 160 is stored in which a medium accommodated in the medium accommodating portion 141 is transported and a printing operation is executed on the transported medium, between the wireless communication unit 30 and the relay circuit board 100 and the main circuit board 110 inside the housing 170.

Figure 20:
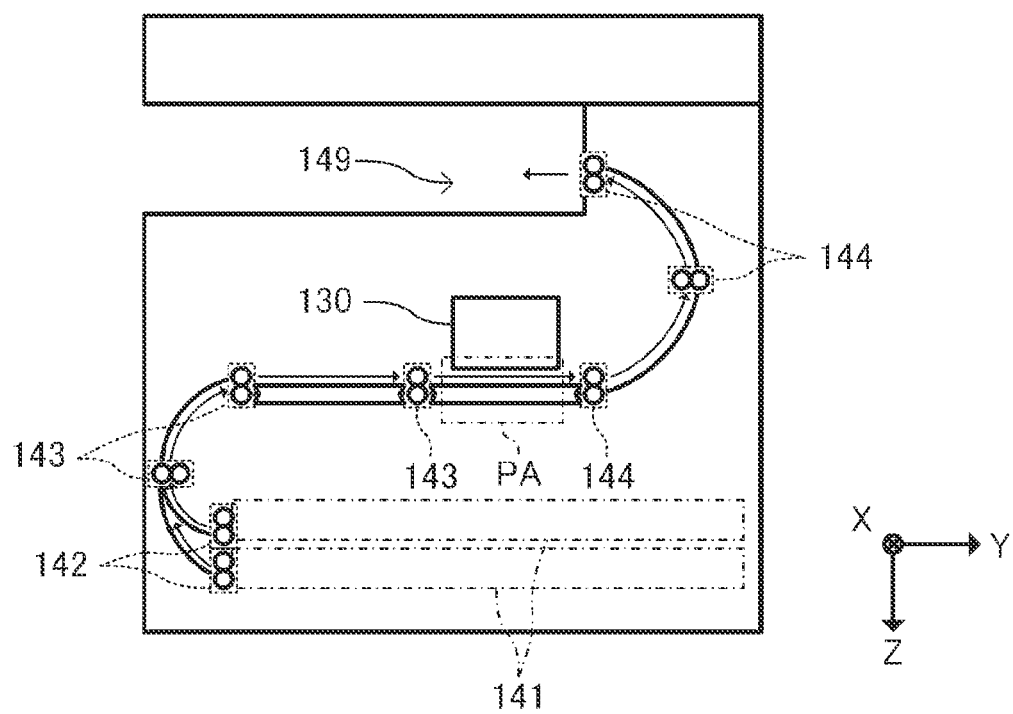
FIG. 20 is a diagram showing an example of a transport path of a medium transported by a printing mechanism.

FIG. 20 is a diagram showing an example of a transport path of the medium transported by the printing mechanism 160 provided inside the housing 170. As shown in FIG. 20, transport rollers 142, 143, and 144 are provided inside the housing 170. Each of the transport rollers 142 to 144 includes a driving roller and a driven roller, and is a pair of rollers. Then, the transport rollers 142 to 144 pinch the medium between the driving roller and the driven roller, and the driving roller is rotated by the drive of the transport motor 150 described above, so that the medium is transported along a predetermined transport direction.

Specifically, the medium accommodated in the medium accommodating portion 141 is discharged one by one by the transport roller 142. Since the transport roller 142 discharges the medium accommodated in the medium accommodating portion 141 one by one, for example, the transport roller 142 may be provided so as to apply pressure to the medium from the −Z side to the +Z side along the Z direction. The medium discharged from the medium accommodating portion 141 is transported to a print area PA facing the ejection head 130 along the transport path in a state of being pinched by the transport roller 143. When the medium reaches the print area PA, the ejection head 130 ejects ink to the medium at a timing based on the print data signal DATA. After that, the medium on which the ink has landed is transported toward the medium discharge tray 149 along the transport path in a state of being pinched by the transport roller 144, and is discharged from the inside of the housing 170 to the medium discharge tray 149.

Here, the housing 170 that stores the printing mechanism 160, the main circuit board 110, the relay circuit board 100, the wireless communication unit 30, and the speaker 60 and has the sound emitting hole 176 is an example of a main housing.

4. Effect

In the printing device 1 according to the present embodiment configured as described above, since the panel unit 20 operated by the operator is not provided with the speaker 60, even when the size of the touch sensor 400 of the panel unit 20 is increased in order to improve the operability of the user, the possibility that the panel unit 20 becomes large is reduced. That is, it is possible to realize the panel unit 20 having the large touch sensor 400. Thereby, even when the user suffers from a symptom accompanied by tremors at the ends of the fingertips and the like, the printing device 1 with excellent operability can be realized. Further, even when the large touch sensor 400 is provided, the weight of the panel unit 20 is also reduced because the possibility that the panel unit 20 becomes large is reduced. Thereby, the rotatability of the panel unit 20 is improved. Therefore, the angle of the rotatably attached panel unit 20 can be easily changed to an optimum angle that is easy for the user to operate, and the panel unit 20 can be held at the optimum angle. As a result, even when the physical characteristics of the user who uses the printing device 1 and the user is using a wheelchair or the like, the possibility of deterioration in operability is reduced.

Further, when the panel unit 20 is in at least one of the attachment state α and the attachment state β, the sound emitting hole 176 is located such that at least a part thereof overlaps the panel unit 20 when the panel unit 20 is viewed from the normal direction of the touch sensor 400. Thereby, the user who operates the panel unit 20 can feel that the operating sound output from the speaker 60 emitted from the sound emitting hole 176 to the outside of the housing 170 is emitted from the panel unit 20. That is, the user can operate the panel unit 20 based on both the visual information displayed on the panel unit 20 and the operating sound emitted from the sound emitting hole 176. Thereby, even when the user has a visual or hearing impairment, the panel unit 20 can be operated in the same manner as a healthy person.

Moreover, since the touch sensor 400 of the panel unit 20 is a capacitive touch sensor and the touch panel 500 including the touch sensor 400 is a capacitive touch panel, the touch sensor 400 and the touch panel 500 can be made thinner, whereby the panel unit 20 having the touch sensor 400 and the touch panel 500 can be made thinner. Thereby, the operating sound emitted from the sound emitting hole 176 provided on the back surface of the panel unit 20 is more clearly propagated to the operator who operates the panel unit 20. As a result, even when the user has a hearing impairment, the operability of the printing device 1 is further improved. Further, by using the touch sensor 400 of the panel unit 20 as a capacitive touch sensor and the touch panel 500 as a capacitive touch panel, compared with the case where the touch sensor 400 is a resistive film type, it can be operated with a smaller force, and the usability of the printing device 1 can be further improved.

As described above, in the printing device 1 according to the present embodiment, the usability thereof can be significantly improved as compared with the printing device in the related art.

The embodiments have been described above, but the present disclosure is not limited to these embodiments and can be carried out in various modes without departing from the scope of the present disclosure. For example, it is possible to combine the above-described embodiments as appropriate.

The present disclosure includes configurations that are substantially the same as the configurations described in the embodiments (for example, configurations having the same function, method, and result, or configurations having the same object and effect). Further, the present disclosure includes configurations in which non-essential parts of the configurations described in the embodiments are replaced. In addition, the present disclosure includes configurations that achieve the same effect as the configurations described in the embodiments or configurations that can achieve the same object. Further, the present disclosure includes configurations in which known techniques are added to the configurations described in the embodiment.

The following contents are derived from the above-described embodiment.

According to an aspect, there is provided a printing device including a printing unit that performs printing on a medium, a panel unit to which operation information for operating the printing unit is input, and a speaker that outputs an operating sound including at least one of an operation sound corresponding to an operation of the panel unit and a state sound indicating an operating state of the printing unit, in which the printing unit includes a printing mechanism that executes a printing operation according to the operation information, a main circuit board including a processor that controls an operation of the panel unit and controls an operation of the printing mechanism based on the operation information, and a main housing that stores the printing mechanism and the main circuit board, the panel unit includes a display panel, a capacitive touch sensor in which a capacitive position detection sensor and a cover glass are laminated, and a panel circuit board electrically coupled to the capacitive touch sensor, the speaker is stored in the main housing, the main housing includes a sound emitting hole that emits the operating sound to an outside of the main housing, the panel unit is rotatably attached to the printing unit so as to take a first attachment state in which an angle formed by a horizontal direction and a normal direction of the capacitive touch sensor is larger than an angle formed by a vertical direction and the normal direction and a second attachment state in which the angle formed by the horizontal direction and the normal direction is smaller than the angle formed by the vertical direction and the normal direction, and in at least one of the first attachment state and the second attachment state, the sound emitting hole is located such that at least a part thereof overlaps the panel unit when the panel unit is viewed from the normal direction.

According to the printing device, by providing a speaker that outputs an operating sound including at least one of an operation sound corresponding to the operation of the panel unit and a state sound indicating the operating state of the printing unit in a main housing to which the panel unit to which operation information for operating the printing unit is input is rotatably attached, the occupied area of the capacitive touch sensor in the panel unit can be increased, and as a result, the panel unit can be provided with a large capacitive touch sensor. Thereby, even when the user suffers from a symptom accompanied by tremors at the ends of the fingertips and the like, the possibility of deterioration in operability of the printing device is reduced.

Further, according to the printing device, in at least one of the first attachment state and the second attachment state, since the sound emitting hole is located such that at least a part thereof overlaps the panel unit when the panel unit is viewed from the normal direction, the user can feel that the operating sound emitted from the sound emitting hole is emitted from the panel unit. That is, the user can operate the panel unit and the printing device based on both visual information displayed on the panel unit and an operating sound emitted from the sound emitting hole. Thereby, even when the user has a visual or hearing impairment, the panel unit and the printing device can be operated in the same manner as a healthy person.

That is, according to the printing device, it is possible to provide a printing device with significantly improved usability as compared with the printing device in the related art.

In the printing device according to the aspect, the panel unit may include a first surface on which the capacitive touch sensor receives an input of the operation information, and a second surface which is located facing the first surface and does not receive the input of the operation information, and a shortest distance between the first surface and the sound emitting hole may be longer than a shortest distance between the second surface and the sound emitting hole.

According to the printing device, the user feels that the operating sound emitted from the sound emitting hole is emitted from the back surface to the front surface of the panel unit. That is, the user can operate the panel unit and the printing device more intuitively based on both visual information displayed on the panel unit and an operating sound emitted from the sound emitting hole. Thereby, even when the user has a visual or hearing impairment, the panel unit and the printing device can be operated in the same manner as a healthy person.

In the printing device according to the aspect, in the first attachment state and the second attachment state, the sound emitting hole may be located such that at least a part thereof overlaps the panel unit when the panel unit is viewed from the normal direction.

According to the printing device, in both the first attachment state and the second attachment state, since the sound emitting hole is located such that at least a part thereof overlaps the panel unit when the panel unit is viewed from the normal direction, the panel unit and the printing device can be operated more easily even when the user has a visual or hearing impairment.

In the printing device according to the aspect, a size of the capacitive touch sensor in a diagonal direction may be 10 inches or more.

According to the printing device, since the panel unit includes a large capacitive touch sensor of 10 inches or more, even when the user suffers from a symptom accompanied by tremors at the ends such as fingertips, the possibility of deterioration in operability of the printing device is further reduced.

In the printing device according to the aspect, the speaker may be a piezoelectric speaker that outputs the operating sound by driving a piezoelectric element.

According to the printing device, the speaker can be miniaturized, and the occupied area of the speaker in the printing device can be reduced. Therefore, the possibility that the printing device becomes large is reduced.

What is claimed is:

1. A printing device comprising:

a printing unit that performs printing on a medium;

a panel unit to which operation information for operating the printing unit is input; and a speaker that outputs an operating sound including at least one of an operation sound corresponding to an operation of the panel unit and a state sound indicating an operating state of the printing unit, wherein the printing unit includes a printing mechanism that executes a printing operation according to the operation information, a main circuit board including a processor that controls an operation of the panel unit and controls an operation of the printing mechanism based on the operation information, and a main housing that stores the printing mechanism and the main circuit board, the panel unit includes a display panel, a capacitive touch sensor in which a capacitive position detection sensor and a cover glass are laminated, and a panel circuit board electrically coupled to the capacitive touch sensor, the speaker is stored in the main housing, the main housing includes a sound emitting hole that emits the operating sound to an outside of the main housing, the panel unit is rotatably attached to the printing unit so as to take a first attachment state in which an angle formed by a horizontal direction and a normal direction of the capacitive touch sensor is larger than an angle formed by a vertical direction and the normal direction and a second attachment state in which the angle formed by the horizontal direction and the normal direction is smaller than the angle formed by the vertical direction and the normal direction, and in at least one of the first attachment state and the second attachment state, the sound emitting hole is located such that at least a part thereof overlaps the panel unit when the panel unit is viewed from the normal direction.

2. The printing device according to claim 1, wherein the panel unit includes a first surface on which the capacitive touch sensor receives an input of the operation information, and a second surface which is located facing the first surface and does not receive the input of the operation information, and a shortest distance between the first surface and the sound emitting hole is longer than a shortest distance between the second surface and the sound emitting hole.

3. The printing device according to claim 1, wherein in the first attachment state and the second attachment state, the sound emitting hole is located such that at least a part thereof overlaps the panel unit when the panel unit is viewed from the normal direction.

4. The printing device according to claim 1, wherein a size of the capacitive touch sensor in a diagonal direction is 10 inches or more.

5. The printing device according to claim 1, wherein the speaker is a piezoelectric speaker that outputs the operating sound by driving a piezoelectric element.

* * * * *